(12) United States Patent
Terashita et al.

(10) Patent No.: US 6,628,359 B1
(45) Date of Patent: Sep. 30, 2003

(54) LIQUID CRYSTAL DISPLAY DEVICE INCLUDING PHASE DIFFERENCE COMPENSATION ELEMENT

(75) Inventors: Shinichi Terashita, Nara-ken (JP); Shuichi Kohzaki, Nara-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/467,017

(22) Filed: Dec. 20, 1999

(30) Foreign Application Priority Data

Dec. 18, 1998 (JP) .......................................... 10-361504
Sep. 28, 1999 (JP) .......................................... 11-275400

(51) Int. Cl.[7] .......................................... G02F 1/1335
(52) U.S. Cl. .......................................... 349/120
(58) Field of Search .................. 349/118, 119, 349/120, 117

(56) References Cited

U.S. PATENT DOCUMENTS

| | | | | |
|---|---|---|---|---|
| 5,543,948 A | * | 8/1996 | Takahashi et al. | 359/73 |
| 5,627,665 A | | 5/1997 | Yamada et al. | |
| 6,195,144 B1 | * | 2/2001 | Murai et al. | 349/117 |
| 6,268,897 B1 | * | 7/2001 | Kim et al. | 349/123 |
| 6,285,431 B2 | * | 9/2001 | Lyu et al. | 349/143 |
| 6,292,242 B1 | * | 9/2001 | VanderPloeg et al. | 349/118 |

FOREIGN PATENT DOCUMENTS

| | | |
|---|---|---|
| JP | 5-2108 | 1/1993 |
| JP | 6-3524 A | 1/1994 |
| JP | 7-28063 A | 1/1995 |
| JP | 7-294732 A | 11/1995 |
| JP | 7-333617 | 12/1995 |
| JP | 9-304764 | 11/1997 |
| JP | 10-3081 | 1/1998 |
| JP | 10-186330 A | 7/1998 |
| JP | 11-95208 | 4/1999 |
| JP | 11-133413 A | 5/1999 |

OTHER PUBLICATIONS

Shin–Tson Wu and Chiung–Shang Wu, "a biaxial film–compensated thin homogeneous cell for feflective liquid crystal display", J. Appl. Phys., vol. 83, pp. 4096–4100.*
Terashita et al; 09/143,615, filed Aug. 28, 1998, entitled "Liquid Crystal Display Device".
H. Murai, et al, "Wide Viewing Angle TFT–LCD Panel with 4–Domain CTN", AM–LCD '96/IDW '96, 1996, pp. 185–188.

* cited by examiner

Primary Examiner—Kenneth Parker
(74) Attorney, Agent, or Firm—Nixon & Vanderhye PC

(57) ABSTRACT

A liquid crystal display device includes a liquid crystal cell having a pair of substrates and a liquid crystal layer. The liquid crystal layer is sandwiched between the pair of substrates. A pair of polarizer elements sandwiches the liquid crystal cell. The liquid crystal display device further includes a phase difference compensation element provided between the liquid crystal cell and at least one of the pair of polarizer elements. A photoelasticity coefficient of the phase difference compensation element is $10 \times 10^{-13}$ $cm^2/dyne$ or less.

20 Claims, 14 Drawing Sheets

Vertical orientation layer

81 { 83

Vertical orientation layer

Horizontal orientation layer

84  } 82

Horizontal orientation layer

Black display

Extinction pattern

LIQUID CRYSTAL DISPLAY DEVICE INCLUDING PHASE DIFFERENCE COMPENSATION ELEMENT

BACKGROUND OF THE INVENTION

1. Field of the Invention

The present invention relates to a display for a computer monitor, and a liquid crystal display device for displaying video images etc., and more particularly to a liquid crystal display device having an excellent viewing angle characteristic.

2. Description of the Related Art

There are two known techniques for improving or widening the viewing angle of a liquid crystal display device: (1) changing orientation directions of liquid crystal molecules within a plane substantially parallel to a substrate surface; and (2) in a display mode where orientation directions of liquid crystal molecules are changed to a direction perpendicular to a substrate surface, dividing into domains having different orientation directions (i.e., azimuthal angle direction) of liquid crystal molecules in a plane parallel to the substrate surface. A typical example of the former technique is the In-Plane-Switching (IPS) mode. Examples of the latter technique include: (1) a wide viewing angle liquid crystal display mode in which each pixel has a liquid crystal region where Np-type liquid crystal (nematic liquid crystal having positive dielectric anisotropy), which is oriented horizontally with respect to a substrate surface in the absence of applied voltage, is oriented axially symmetrically (Japanese Laid-Open Publication No. 7-120728); (2) a wide viewing angle liquid crystal display mode in which Nn-type liquid crystal (nematic liquid crystal having negative dielectric anisotropy), which is oriented substantially perpendicular to a substrate surface in the absence of applied voltage, is divided into a plurality of domains in which the falling directions in the presence of applied voltage are different (Japanese Laid-Open Publication No. 7-64089); and (3) a wide viewing angle liquid crystal display mode in which Np-type liquid crystal molecules in each pixel are divided substantially equally into four and are horizontally oriented (AM-LCD '96, p. 185(1996)). In the latter technique, a phase difference compensation element is requited on a principle so as to compensate a viewing angle of a 45° direction with respect to the absorption axis of a polarizer element.

Herein, the term "phase difference compensation element" means an optical component having birefringence in the form of a plate, sheet, or film. The term "polarizer element" means an optical component which absorbs one of two orthogonal beams of polarized light and passes the other beam. The absorption axis and transmission (polarization) axis of the polarizer are orthogonally crossed.

A phase difference film is currently made of stretched film. As resin material of the stretched film, polyvinylalcohol (PVA) and polycarbonate (PC) are commonly used. The phase difference film is required to have the following optical and mechanical characteristics, (1) optical characteristics: less nonuniformity of phase difference, ability to match a wavelength dispersion characteristic of birefringence of a liquid crystal layer, ahigh level of heat resistance and moisture resistance, no optical defects such as light axis disturbance and contaminants, ahigh level of transmission, a small photoelasticity coefficient, performance of resisting transmission deterioration due to ultraviolet light, and the like; and (2) mechanical characteristics: a high level of elasticity, a high level of tensile strength, a high level of yield bending strength, and the like.

The phase difference film is also required to be easy to process (e.g., easy to stretch) in the course of its manufacture. Among the above-described required characteristics, practically important characteristics are less phase difference nonuniformity, ability to match a wavelength dispersion characteristic of birefringence of a liquid crystal layer, and a small photoelasticity coefficient.

Japanese Laid-Open Publication No. 6-3524 discloses a uniaxial optical phase difference film made of crystalline copolymer of monochlorotrif luoroethylene (80–98 wt %) and fluorovinylidene (2–20 wt %) which is aligned in one direction.

The inventors have found that liquid crystal display devices using the above-described conventional phase retardation member have the following problems.

A phase retardation member disclosed in Japanese Laid-Open Publication No. 6-3524 cannot satisfy a retardation condition necessary for improving the display quality of a liquid crystal display device with a large screen (e.g., 42 inch type) or a liquid crystal display device including a liquid crystal layer having two or more different kinds of liquid crystal regions taking different initial orientation states in each of a plurality of pixels; or a liquid crystal layer having a liquid crystal region in which orientation directions of liquid crystal molecules continuously vary. In other words, when the phase retardation member is applied to these liquid crystal display devices, an insufficient viewing angle compensation effect is obtained and thus a viewing angle is so narrow that an image on the display screen becomes yellowish when viewing from a slanted direction. It is also difficult to manufacture the phase retardation member without nonuniformity of color having such a size that the member may be applied to a liquid crystal display device with a large screen (e.g., 42 inch type). Herein below, problems that the inventors have found will be described in detail with reference to the accompanying drawings.

In a large-size display device, e.g., 42-inch liquid crystal display device, various stresses are put on a phase difference compensation element. The various stresses are, for example, (1) a stress generated by attachment of a polarizer to the phase difference compensation element, or attachment of a liquid crystal cell to a polarizer attached to the phase difference compensation element; and (2) a stress due to heat generated by backlighting. As a result, the phase difference compensation element has retardation caused by the locally occurring stresses. This state is fixed by an adhesive. As a result, the transmission of the device is locally increased in a crossed-Nicols arrangement of the polarizers, whereby the brightness of the device becomes irregular and thus its display quality is largely impaired.

FIG. 1 schematically illustrates a display surface 10 of a large-size liquid crystal display device. FIG. 1 shows local areas having increased transmission (light leakage) caused by the above-described stresses in a black display state. Light leakage (type 1) caused by a stress generated by attachment of a polarizer to a phase difference compensation element often emerges around the center of each of four edges of the display surface 10. Light leakage (type 2) caused by a stress due to heat generated by backlighting emerges at the four corners of the display surface 10. The degree of light leakage caused by these stresses depends on the magnitudes of the stresses and the photoelasticity coefficient of the material of the phase difference compensation element.

In the above-described display mode in which a pixel is divided into domains having different orientation directions of liquid crystal molecules, there is a problem that a viewing angle characteristic in a direction of an axis bisecting an angle between the absorption axes of an upper polarizer and a lower polarizer both sandwiching a liquid crystal cell (a viewing angle of a 45° direction with respect to the absorption axis of a polarizer) becomes significantly worse compared with a viewing angle characteristic in a direction of the absorption axis (see FIG. 14 that illustrates isocontrast contour curves of Comparative Example 1 which will be described below).

Positions of polarizers in a liquid crystal display device and a definition of a direction of a viewing angle will be described with reference to FIGS. 2A and 2B.

FIG. 2A is a diagram schematically illustrating a crossed-Nicols arrangement of polarizers in a liquid crystal display device. A polarizer disposed at a side nearer a viewer of a liquid crystal cell 20 is referred to as an upper polarizer. A polarizer disposed at a side nearer a backlight of a liquid crystal cell 20 is referred to as a lower polarizer. The absorption axis 22a of the upper polarizer is orthogonal to the absorption axis 22b of the lower polarizer. As shown in FIG. 2B, a viewing direction (a direction of a viewer's line of sight 20) is defined by (1) an angle from a normal line 26 with respect to a virtual plane 24 parallel to the display surface of a liquid crystal display device (viewing angle θ) and (2) an angle from a direction 28 of the absorption axis of the upper polarizer (azimuthal angle Φ: the anticlockwise direction is positive). Contrast ratios are evaluated with respect to θ-Φ to obtain isocontrast contour curves irrespective of the display mode. Note that an x-y-z orthogonal coordinate system is used to define the anisotropy of an optical characteristic of a liquid crystal display device where the z axis is along a direction of the normal line 26 of a virtual plane 24; the x axis is along a direction of Φ=270° in the virtual plane 24; and the y axis is along a direction of Φ=0° in the virtual plane 24.

As shown in FIG. 3A, a commercially available polarizer 30 generally includes a polarization layer 32 sandwiched between supporting films 34 and 36. The polarization layer 32 (e.g., made of PVA) has less strength and is therefore supported by the supporting films 34 and 36 (e.g., made of triacetylcellulose (TAC)). As shown in FIG. 3B, a direction 32a of the absorption axis of the polarization layer 32 is almost the same as directions 34a and 36a of the slow axes of the respective supporting films 34 and 36.

SUMMARY OF THE INVENTION

A liquid crystal display device according to the present invention includes a liquid crystal cell having a pair of substrates and a liquid crystal layer, the liquid crystal layer being sandwiched between the pair of substrates; a pair of polarizer elements sandwiching the liquid crystal cell; and a phase difference compensation element provided between the liquid crystal cell and at least one of the pair of polarizer elements. A photoelasticity coefficient of the phase difference compensation element is $10 \times 10^{-13}$ cm$^2$/dyne or less.

In one embodiment of the present invention, the phase difference compensation element has three refractive indices $n_x$, $n_y$, and $n_z$ in directions of x, y, and z axes which are orthogonal to each other, and the refractive indices $n_x$, $n_y$, and $n_z$ satisfies a relationship $n_z < n_y < n_x$ where the $n_x$ and $n_y$ are principal refractive indices in a plane parallel to a surface of the liquid crystal cell and the $n_z$ is a principal refractive index in the thickness direction of the liquid crystal cell.

In one embodiment of the present invention, the liquid crystal cell has a plurality of pixels, and each of the plurality of pixels has two or more liquid crystal domains having different initial orientation states or has a liquid crystal region where orientation directions of liquid crystal molecules therein continuously vary. The liquid crystal display device includes two phase difference compensation elements, a first phase difference compensation element being sandwiched between the liquid crystal cell and one of the pair of polarizer elements and a second phase difference compensation element being sandwiched between the liquid crystal cell and the other of the pair of polarizer elements. Each of the first and second phase difference compensation elements include a phase difference film. The phase difference film has the slow axis in a plane parallel to a surface of the liquid crystal cell. The slow axes in the plane parallel to a surface of the liquid crystal cell, of the first and second phase difference compensation elements are orthogonally crossed.

In one embodiment of the present invention, the liquid crystal display device includes two phase difference compensation elements, a first phase difference compensation element being sandwiched between the liquid crystal cell and one of the pair of polarizer elements and a second phase difference compensation element being sandwiched between the liquid crystal cell and the other of the pair of polarizer elements. Each of the first and second phase difference compensation elements has the slow axis in a plane parallel to a surface of the liquid crystal cell. The slow axis of the first phase difference compensation element is orthogonal to the absorption axis of one of the pair of polarizer elements provided on the same side with respect to the liquid crystal cell as the first phase difference compensation element, and the slow axis of the second phase difference compensation element is orthogonal to the absorption axis of one of the pair of polarizer elements provided on the same side with respect to the liquid crystal cell as the second phase difference compensation element.

In one embodiment of the present invention, the liquid crystal layer includes nematic liquid crystal material. Liquid crystal molecules of the nematic liquid crystal material are, in a black display, oriented in a direction substantially perpendicular to a surface of the pair of substrate.

In one embodiment of the present invention, the liquid crystal layer includes nematic liquid crystal material having negative dielectric anisotropy. Liquid crystal molecules of the nematic liquid crystal material are, in the absence of applied voltage, oriented in a direction substantially perpendicular to a surface of the pair of substrates.

In one embodiment of the present invention, the liquid crystal display device satisfies relationships $$0.11 < \{d_f(n_x - n_z)\}/(d_{LC} \cdot \Delta n) < 0.75 \text{ and}$$

$$0 < \{d_f(n_x - n_y)\}/(d_{LC} \cdot \Delta n) < 0.26$$

where $\Delta n$ is a birefringence of the liquid crystal molecule of the liquid crystal layer, $d_{LC}$ is an average thickness of the liquid crystal layer, and $d_f$ is a thickness of the phase difference compensation element.

In one embodiment of the present invention, each of the pair of polarizer elements is a polarizer layer formed on a supporting film, and the supporting film serves as the phase difference compensation element.

In one embodiment of the present invention, the phase difference compensation element includes liquid crystal polymer.

In one embodiment of the present invention, the liquid crystal cell has a plurality of pixels, and each of the plurality of pixels has two or more liquid crystal domains having differen t initial orientation states or has a liquid crystal region where orientation directions of liquid crystal molecules therein continuously vary. The liquid crystal display device includes two phase difference compensation elements, a first phase difference compensation element being sandwiched between the liquid crystal cell and one of the pair of polarizer elements and a second phase difference compensation element being sandwiched between the liquid crystal cell and the other of the pair of polarizer elements. Each of the first and second phase difference compensation elements include a plurality of layered phase difference films, each of the plurality of phase difference films having the slow axis in a plane parallel to a surface of the liquid crystal cell. The slow axes in the plane parallel to a surface of the liquid crystal cell, of the first and second phase difference compensation elements are orthogonally crossed to each other.

In one embodiment of the present invention, the phase difference film has a layered structure in which two or more uniaxial films are attached to each other. At least one of the uniaxial films has retardation in the plane and in a direction of a normal line.

In one embodiment of the present invention, the phase difference film has a structure in which material having refractive index anisotropy is layered on a supporting film.

Thus, the invention described herein makes possible the advantages of providing a liquid crystal display device having substantially no nonuniformity of brightness due to the stresses wherein the device has a structure in which a phase difference compensation element is attached to a polarizer or to a liquid crystal panel, and therefore having uniform display quality.

Herein below, the action of the present invention will be described.

Providing a phase difference compensation element having a photoelasticity coefficient of $10 \times 10^{-13}$ cm$^2$/dyne or less can reduce generation of nonuniformity of polarization in a device having a structure in which a phase difference compensation element is attached to a polarizer, or a combination of the polarizer and the phase difference compensation element is attached to a surface of a liquid crystal cell, thereby obtaining uniform display quality. The phase difference compensation element of the present invention has non-zero birefringence, and preferably an average refractive index in the range of 1.4–1.7.

When the principal refractive indices $n_x$, $n_y$, and $n_z$ of the phase difference compensation element satisfies a relationship $n_z < n_y < n_x$, a viewing angle characteristic in a 45° direction with respect to the absorption axis of a polarizer can be improved.

To reduce dependence of a viewing angle characteristic on azimuthal angles, it is effective that the refractive index anisotropy in the short axis direction of a liquid crystal molecule is decreased. To this end, two or more domains having different orientation states of liquid crystal may be provided in each pixel. Further, when the orientation states of liquid crystal molecules in each pixel vary continuously (axially symmetrical or radial orientation), the refractive index anisotropy in the short axis direction of a liquid crystal molecule is decreased to a minimum. In this case, the dependence of a viewing angle characteristic on azimuthal angles can be improved to a maximum. It is desirable that the phase difference compensation element consists of one sheet of phase difference film from the view point of cost and fabrication process, although the phase difference compensation element may include a plurality of sheets of phase difference film.

In the case where one phase difference compensation element is provided in each of the spaces between the liquid crystal cell and a pair of the polarizers, when the slow axes of a pair of the phase difference compensation elements are orthogonally crossed, in-plane phase difference does not occur between the phase difference compensation elements and the liquid crystal cell, thereby preventing reduction of the contrast ratio. When the absorption axis of the polarizer and the slow axis of the phase difference compensation element are orthogonally crossed, the viewing angle compensation effect in a 45° direction with respect to the absorption axis of the polarizer is further effectively obtained.

When liquid crystal molecules are oriented in a direction perpendicular to the substrate surface, the refractive index anisotropy in a plane of the liquid crystal cell is small. Therefore, light leakage in a black level is reduced even when a viewing angle is fallen in a 45° direction with respect to the absorption axis of the polarizer, thereby preventing from lowering the contrast and achieving further compensation of a viewing angle. This effect is significant in a normally black mode display device which employs an Nn liquid crystal material having negative dielectric anisotropy.

Specifically, for example, when $0.11 < \{d_f \cdot (n_x - n_z)\}/(d_{LC} \cdot \Delta n) < 0.75$ and $0 < d_f \cdot (n_x - n_y)\}/(d_{LC} \cdot \Delta n) < 0.26$ are satisfied, where $\Delta n$ is the birefringence of liquid crystal molecules of a liquid crystal layer, $d_{LC}$ is the average thickness of the liquid crystal layer, and $d_f$ is the thickness of a phase difference compensation element, a significant effect is obtained.

The supporting film of the polarizer has retardation in a plane of the film and in the normal direction of the film. When the retardation of an additional phase difference compensation element is designed by taking into account the retardation of the supporting film, an optimal retardation can be obtained where the viewing angle compensation effect is maximized. The phase difference compensation element can be used as the supporting film of the polarizer. In this case, the phase difference compensation element is made in the fabrication process of the polarizer. This is advantageous from the viewpoint of cost and the process of attaching to a liquid crystal panel.

The liquid crystal polymer is an optically anisotropic molecule. The molecule is oriented on an orientation layer of a substrate. Therefore, a desired retardation can be easily obtained by coating a substrate (e.g., supporting substrate) with such liquid crystal polymer without stretching the film. This may lead to a reduction in cost. The refractive index anisotropy of a film can be variously set by controlling the orientation of the liquid crystal polymer.

These and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention will be described with reference to the accompanying drawings. Firstly, the principle of the present invention will be explained.

Figure 1:
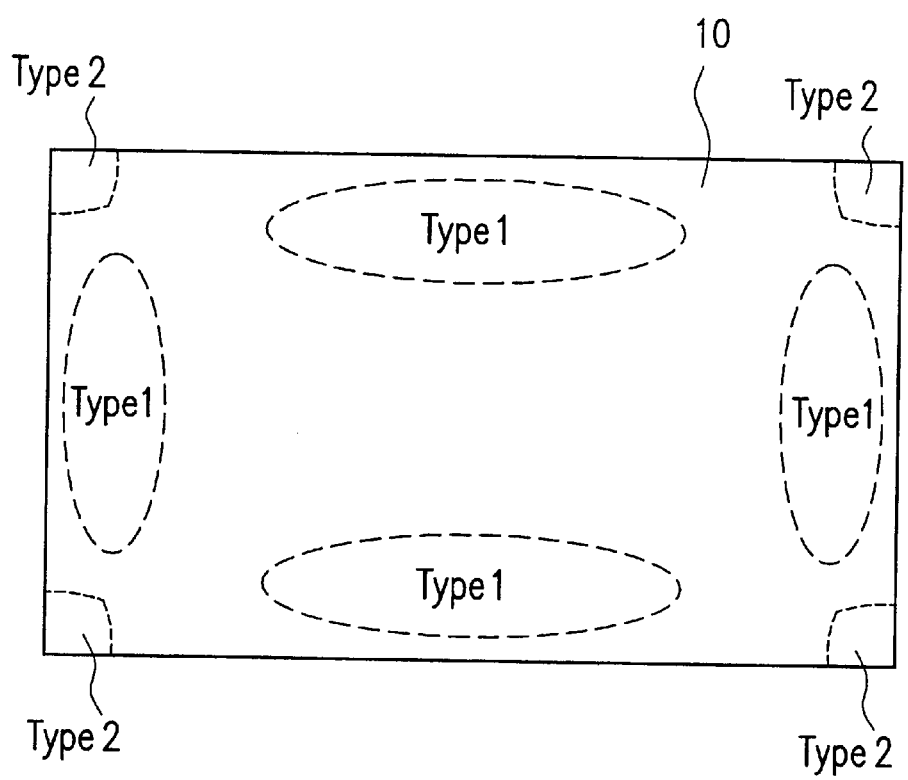
FIG. 1 is a diagram schematically illustrating types and places of light leakage caused by stresses in a liquid crystal display device.
Figure 2A:
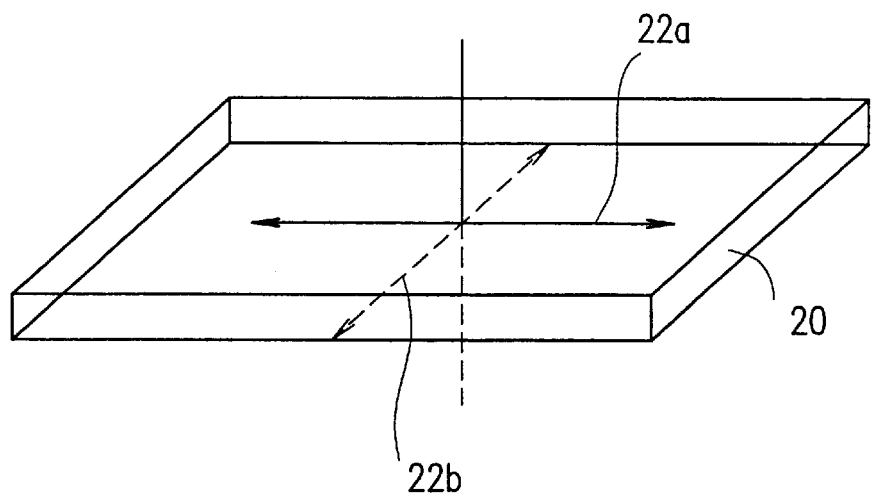
FIG. 2A is a diagram schematically illustrating a spatial relationship between the absorption axes of polarizers in a liquid crystal display device.
Figure 2B:
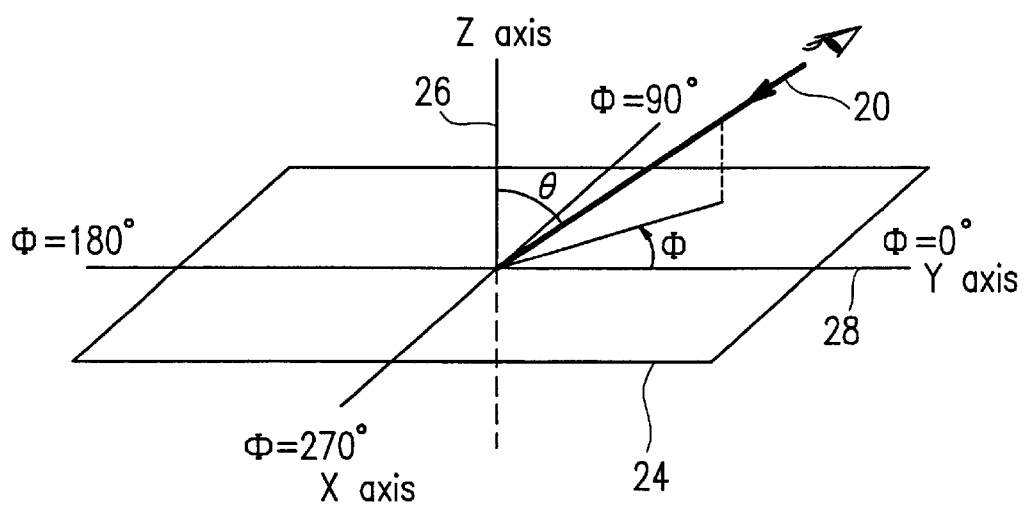
FIG. 2B is a diagram for explaining definitions of a viewing angle and a azimuthal angle used for evaluating a viewing angle characteristic of a liquid crystal display device.
Figure 3A:
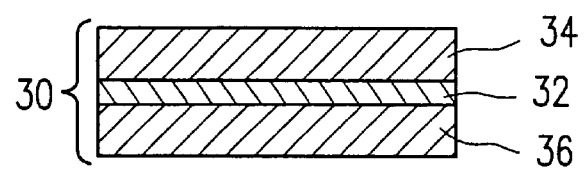
FIG. 3A is a cross-sectional view of a polarizer.
Figure 3B:
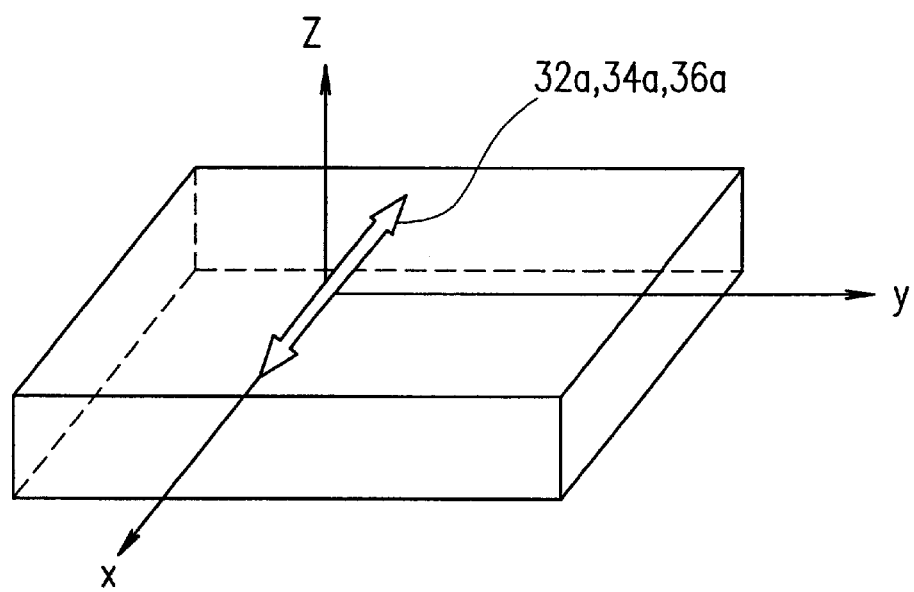
FIG. 3B is a diagram illustrating an orthogonal coordinate system for defining an optical characteristic of a polarizer.
Figure 4:
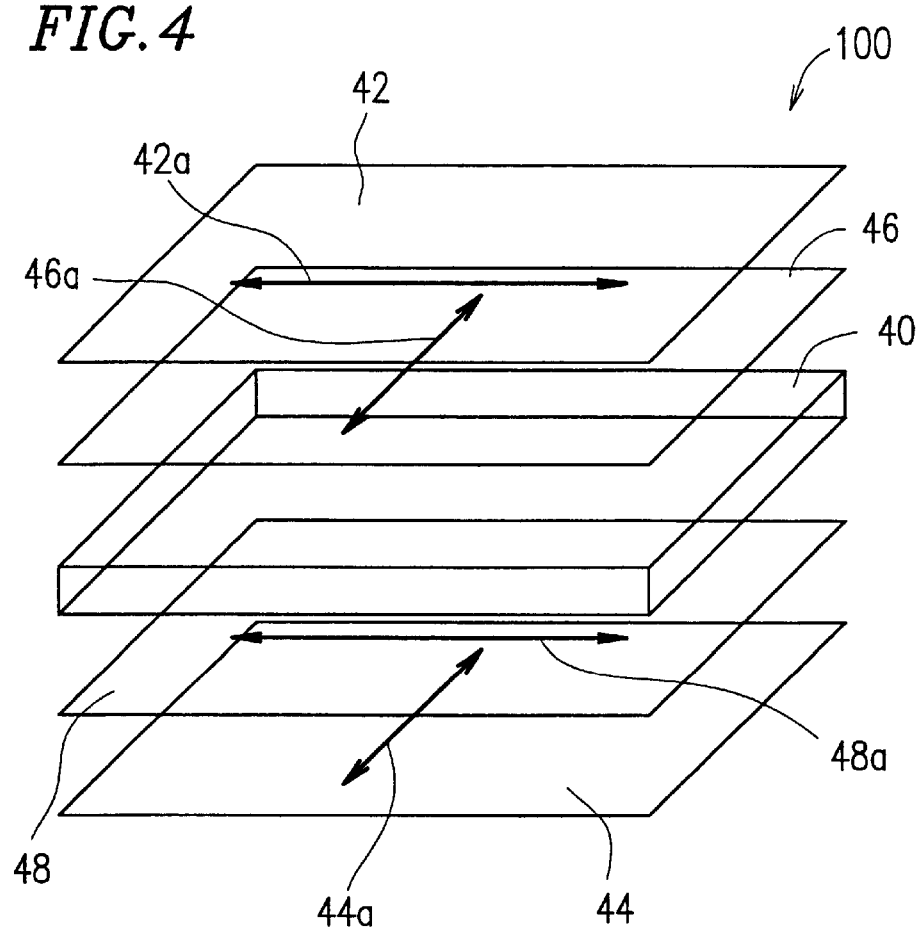
FIG. 4 is an exploded, perspective view schematically illustrating a liquid crystal display device according to an embodiment of the present invention.

FIG. 4 is an exploded, perspective view illustrating schematically a configuration of a liquid crystal display device 100 according to the present invention. The liquid crystal display device 100 includes a liquid crystal cell 40, an upper polarizer 42 and a lower polarizer 44, and an upper phase difference compensation element 46 and a lower phase difference compensation element 48. The liquid crystal cell 40 is interposed between the polarizers 42 and 44. The phase difference compensation elements 46 and 48 are provided between the liquid crystal cell 40 and the polarizers 42 and 44, respectively. One of the phase difference compensation elements 46 and 48 may be omitted. The polarizer 42 and phase difference compensation element 46 disposed at a side nearer a viewer of the liquid crystal cell 40 is referred to as an upper polarizer and an upper phase difference compensation element, respectively. The polarizer 44 and phase difference compensation element 48 disposed at an opposite side to the viewer, i.e., a side nearer a backlight (not shown) of the liquid crystal cell 40 is referred to as a lower polarizer and a lower phase difference compensation element, respectively.

Figure 5A:
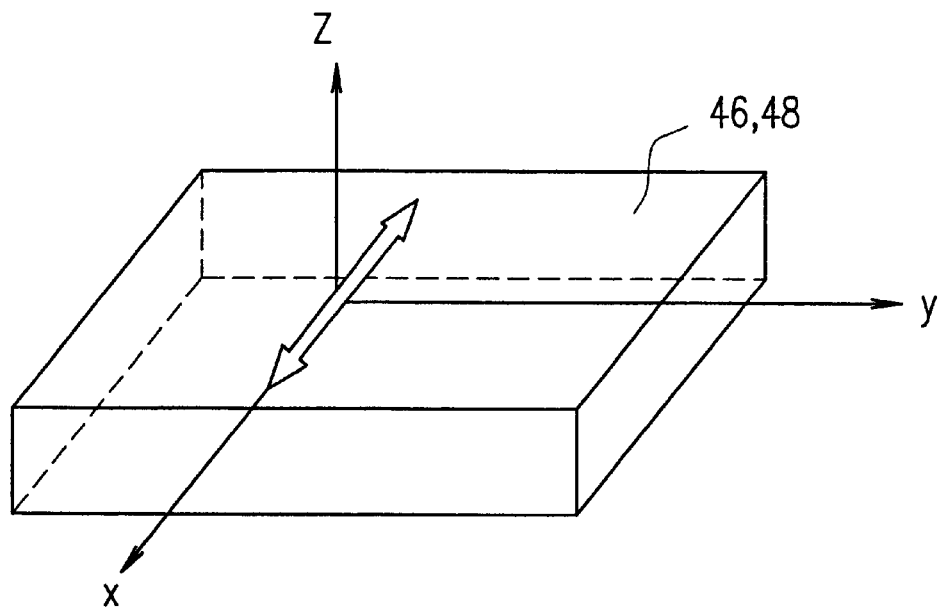
FIG. 5A is a diagram illustrating an orthogonal coordinate system for defining an optical characteristic of a phase difference compensation element.

Herein, the anisotropy of a refractive index of the phase difference compensation element (e.g., the phase difference compensation element 46 and 48 shown in FIG. 4) is defined in an orthogonal coordinate system shown in FIG. 5A, where the z axis is along a direction perpendicular to surfaces of the phase difference compensation elements 46 and 48; and the x and y axes are in a plane parallel to the surfaces of the phase difference compensation elements 46 and 48: and the x axis is along a direction of the slow axes of the phase difference compensation elements 46 and 48. When the three principal refractive indices of the refractive index ellipsoids of the phase difference compensation elements 46 and 48 are designated by $n_x$, $n_y$, and $n_z$, a relationship $n_x>n_y>n_z$ is satisfied.

Figure 5B:
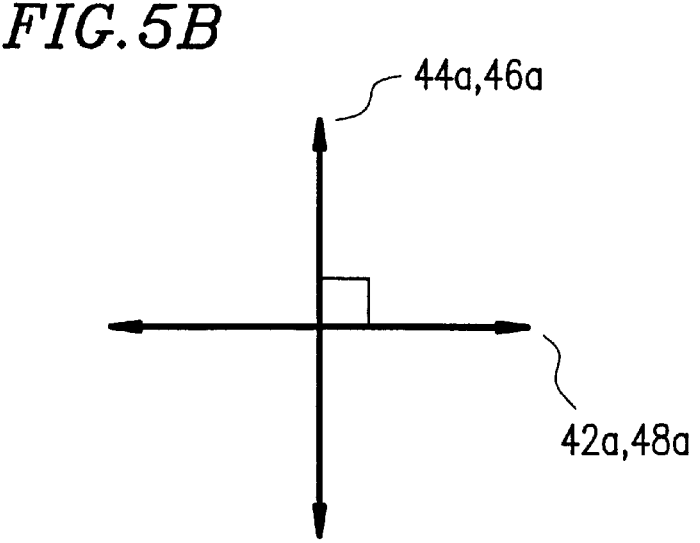
FIG. 5B is a diagram illustrating a spatial relationship between the absorption axis of a polarizer and the slow axis of a phase difference compensation element in a liquid crystal display device according to an embodiment of the present invention.

As shown in FIGS. 4 and 5B, the absorption axis 42a of the upper polarizer 42 and the absorption axis 44a of the lower polarizer 44 are orthogonally crossed. The slow axis 46a of the upper phase difference compensation element 46 and the slow axis 48a of the lower phase difference compensation element 48 are also orthogonally crossed. The direction of the absorption axis 42a of the upper polarizer 42 matches that of the slow axis 48a of the lower phase difference compensation element 48 while the direction of the absorption axis 44a of the lower polarizer 44 matches that of the slow axis 46a of the upper phase difference compensation element 46.

Further, enhancement of the viewing angle characteristic in a 45° direction with respect to the absorption axis can be achieved by providing an anti-reflection coating film (AR coating) or an anti-glare layer coated with a hard coat scattering layer on a surface of the polarizers 42 and 44.

A description will be given of a reduction in light leakage caused by stresses put on the phase difference compensation elements 46 and 48 below.

When a stress such as compressive force, tensile force, and heat is put on a substance, the specific gravity of the substance may vary, or the coordination or alignment of atoms and molecules occurs, causing anisotropy of refractive indices. The stress will introduce non-zero birefringence into an isotropic substance inherently with zero birefringence. The non-zero birefringence of an anisotropic optical substance is changed due to the stress. This is a so-called stress birefringence. A birefringence per unit of stress, i.e., a value obtained by dividing the birefringence (or a change of birefringence) caused by a stress applied to the substance by the stress is called a photoelasticity coefficient. The photoelasticity coefficient is determined by: varying the applied stress; measuring the generated stress birefringence; plotting the generated stress birefringence with respect to the stress on a graph: and evaluating the slope of the plotted straight line.

Figure 6A:
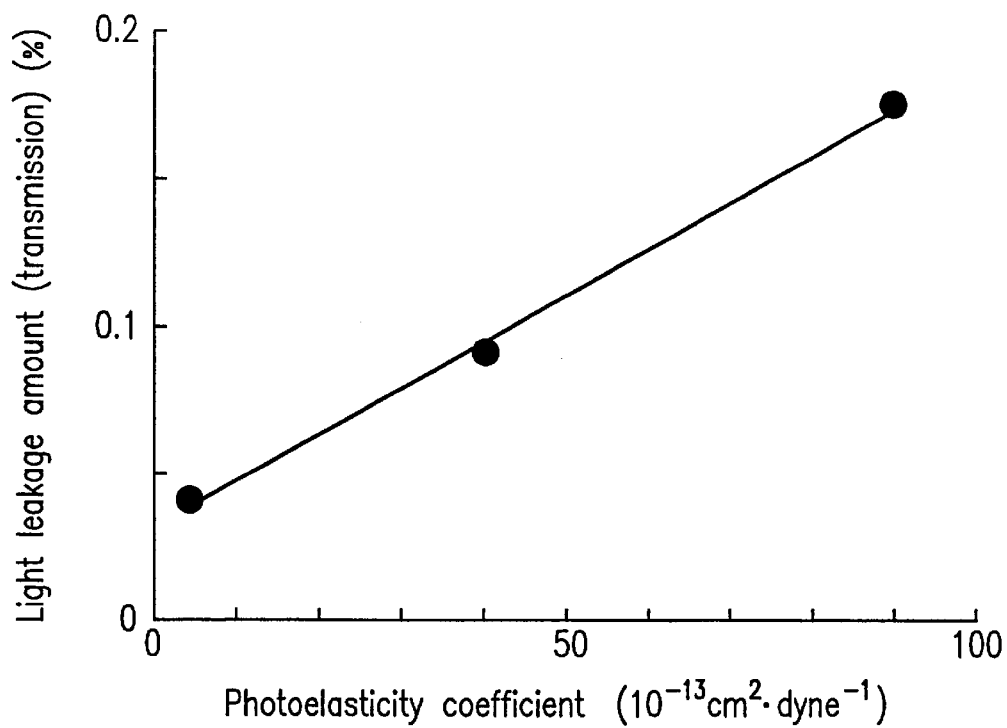
FIG. 6A is a graph showing a relationship between a photoelasticity coefficient of a phase difference compensation element and an amount of light leakage (transmission) in the crossed-Nicols arrangement of polarizers when the phase difference compensation element is attached to a 42-inch glass plate and a tensile stress is applied.

In FIG. 6A, a phase difference compensation element is attached to a 42-inch glass and a tensile stress is applied, where polarizers are in the crossed-Nicols arrangement. FIG. 6A illustrates the relationship between the photoelasticity coefficient of the phase difference compensation element and the amount of light leakage (transmission) of the phase difference compensation element. As can be seen from FIG. 6A, the light leakage increases linearly along with the increase of the photoelasticity.

Figure 6B:
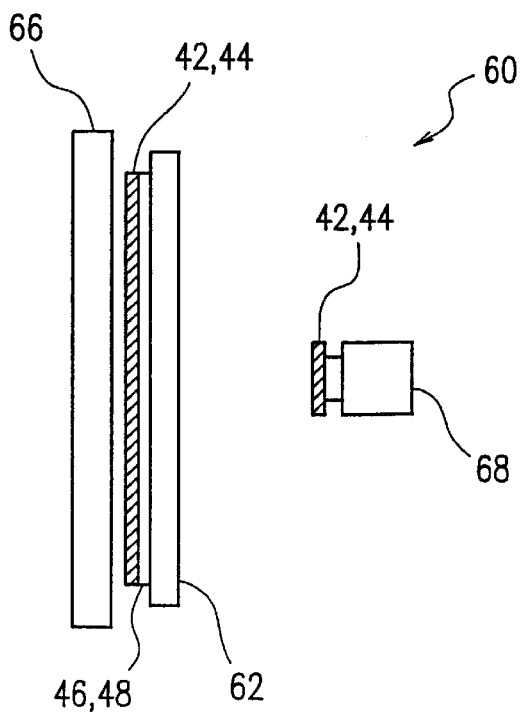
FIG. 6B is a diagram schematically illustrating an optical system for evaluating light leakage.

The transmission was measured using an optical system shown in FIG. 6B. A polarizer 42 and a phase difference compensation element 46 (or a polarizer 44 and a phase difference compensation element 48) shown in FIG. 4 are attached to a glass plate 62 (regarded as a liquid crystal cell) with a given adhesive used in an actual manufacturing process. This device is illuminated by a backlight 66. The polarizer 44 (or 42) is arranged in the crossed-Nicols relationship with the polarizer 42 (or 44) attached to the phase difference compensation element 46 (or 48) to be measured. The amount of transmitted light was measured through a polarizer 44 (or 42) using an instrument 68 for measuring brightness (e.g., the luminance meter BM5A produced by TOPCON Corporation).

Figure 6C:
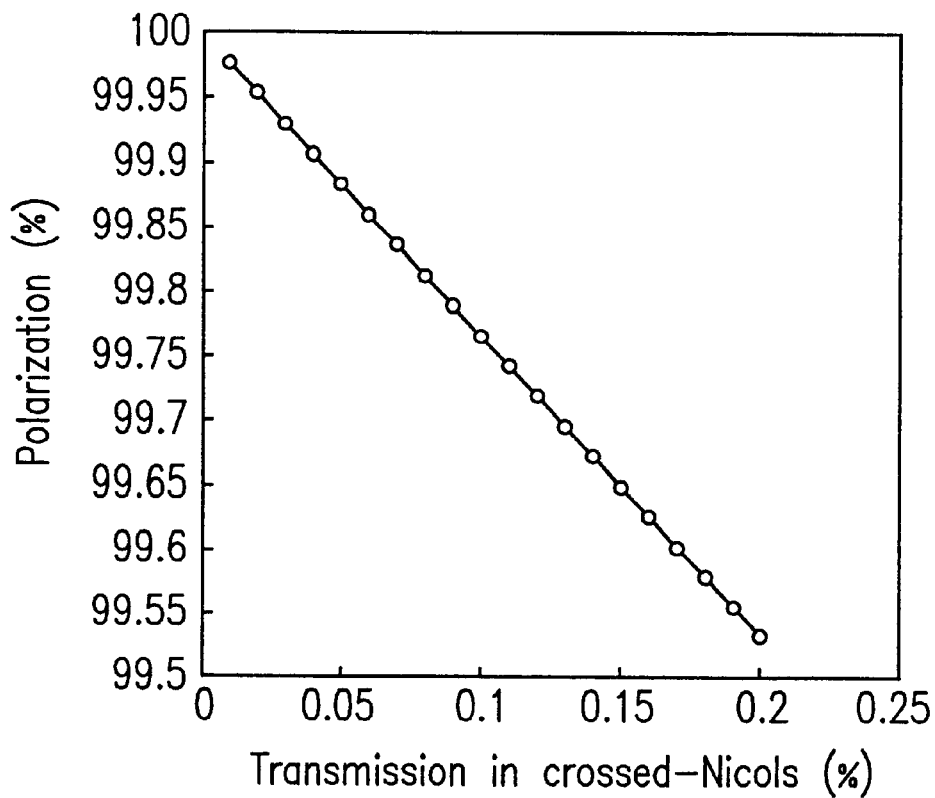
FIG. 6C is a graph showing a relationship between transmission and polarization in the crossed-Nicols arrangement of polarizers.

The relationship between the transmission in the crossed-Nicols arrangement and the polarization is shown in FIG. 6C. The relationship was evaluated using the following expression:

$$\text{Polarization } (\%) = \{(P_{//} - P_\perp)/(P_{//} + P_\perp)\} \cdot 100$$

Where $P_{//}$ is the transmission in the parallel-Nicols arrangement (43%) assuming that air has 100% transmission: and $P_\perp$ is the transmission in the crossed-Nicols arrangement.

A liquid crystal display does not generate light by itself and is therefore required to have a high level of brightness and contrast. Accordingly, a polarizer should have a high level of brightness and polarization. Theoretically, the transmission of a single polarizer is maximally 50%, and the polarization thereof is maximally 100% (W. A. Shurcliff; Polarization and its Application, Kyoritsu Shuppan, 9 (1965)). The nearer to the theoretical maximum values the parameters, the better the viewing characteristic of the liquid crystal display. A polarizer having 99.9% polarization by itself is a common specification in commercially available polarizers. The target value of the polarization of a polarizer when attached to a phase difference compensation element of the present invention is 99.9%. The polarization is preferably 99.9% or more, resulting in a better viewing character of the display (a higher contrast ratio).

In a common high contrast liquid crystal display device, in order to obtain 99.9% polarization characteristic of polarizers in a sufficient crossed-Nicols arrangement, for example, the amount of light leakage (transmission) of the entire phase difference compensation element is required to be 0.04% or less according to the relationship between the transmission in the crossed-Nicols arrangement and the polarization as shown in FIG. 6C.

Figure 7:
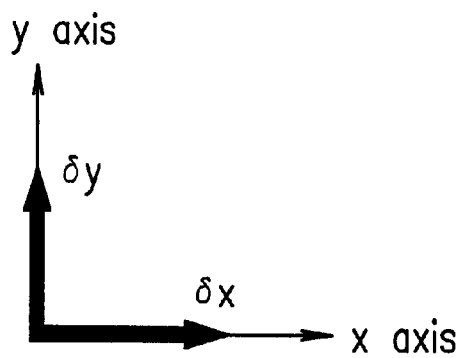
FIG. 7 is a schematic diagram for explaining a mechanism of light leakage caused by a model stress put on a phase difference compensation element.

As shown in FIG. 7, the amount of light leakage (σ) caused by the stress put on the phase difference compensation element when attached to the polarizer is approximately calculated by the following expression:

$$\Delta = cd |\sigma x - \sigma y|$$

where c is a photoelasticity coefficient, d is a thickness of the phase difference compensation element, σx is a vector along the x axis of the stress, and σy is a vector along the y axis of the stress.

The above expression shows that the light leakage amount (display quality) is determined by the photoelasticity coefficient of the phase difference compensation element and the magnitude of the stress when the phase difference compensation element and the polarizer are attached to the liquid crystal cell. Assuming that a stress generated at the time of the attachment or heating is constant irrespective of material, the photoelasticity coefficient of the phase difference compensation element needs to be $10 \times 10^{-13}$ cm$^2$/dyne or less in order to obtain a 0.04% or less light leakage amount (transmission) of the phase difference compensation element in the crossed-Nicols arrangement of the polarizers.

Examples of material of the phase difference compensation element and the polarizer having a $10 \times 10^{-13}$ cm$^2$/dyne or less photoelasticity coefficient include liquid crystal polymer (discotic family and the like), ARTON (norbornene resin), TAC (triacetylcellulose) and the like. A phase difference compensation element may be made of a stretched film, or formed of a plurality of laminated phase difference films in order to obtain the desired retardation. Alternatively, a phase difference compensation element may include a supporting substrate, a coating, and a phase difference film: the supporting substrate is coated with a material having refractive index anisotropy, such as liquid crystal polymer, in order to obtain negative retardation in a direction normal to the substrate; and the phase difference film is attached on the coated surface of the supporting substrate, so that a phase difference compensation element having a desired retardation can be obtained. TAC is suitable for the material of the supporting substrate. Alternatively, the supporting substrate may have a function of positive uniaxial phase difference compensation element and a phase difference film made of liquid crystal polymer and having negative birefringence can be laminated so that the phase difference compensation element can obtain the desired retardation.

To attach a polarizer to a phase difference compensation element, or attach the integrated product of the polarizer and the phase difference compensation element to a surface of a liquid crystal display panel, an adhesive is used. Such an adhesive is preferably made of a material which relieves a stress or heat largely (instead has relatively low adhesion). Alternatively, an adhesive may form a layer having a great thickness such that a stress or heat is largely relieved.

Figure 8A:
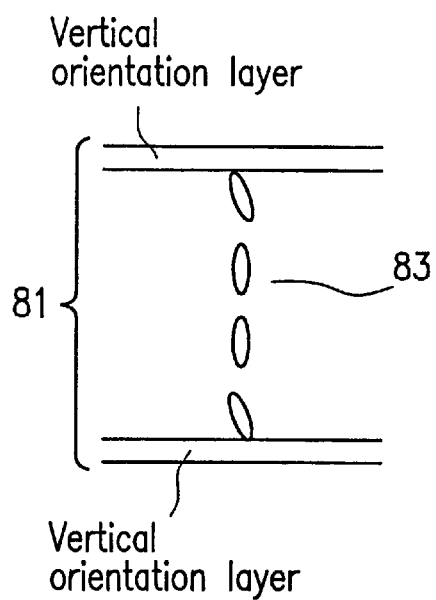
FIG. 8A and FIG. 8B are diagrams schematically illustrating an alignment orientation of liquid crystal molecules in a black display.
Figure 8B:
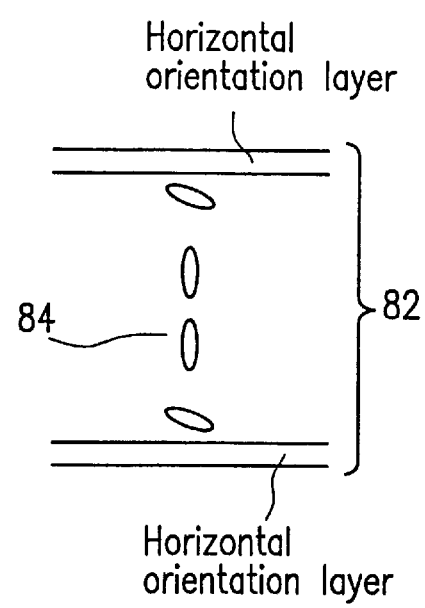

The present invention can be preferably applied to a display mode where black is displayed when liquid crystal molecules are oriented perpendicularly to a substrate. The directors of the liquid crystal molecules when displaying black are oriented in a direction perpendicular to the substrate irrespective of an orientation division method. It is the phase difference compensation element of the present invention that prevents the transmission of a black level from increasing in a black display state. As shown in FIG. 8A, in the case where a liquid crystal cell 81 is made of Nn-type liquid crystal, when the liquid crystal molecules 83 are oriented substantially perpendicularly to a substrate surface in the absence of applied voltage (normally black mode), a viewing angle compensation effect is large. As FIG. 8B, in the case where a liquid crystal cell 82 is made of Np-type liquid crystal, when the liquid crystal molecules 84 are oriented substantially perpendicularly to a substrate surface in the presence of applied saturated voltage (normally white mode), a viewing angle compensation effect is large. The present invention can be applied to a liquid crystal cell using any display mode when the refractive index anisotropy within a plane substantially parallel to a surface of a liquid crystal cell is less in a black display than in a white display.

Embodiments

In embodiments of the present invention, as shown in FIG. 4, the phase difference compensation elements 46 and 48 are disposed between the liquid crystal cell 40 and the polarizers 42 and 44, respectively. In the phase difference compensation elements 46 and 48, the average refractive indices ($n_x$, $n_y$) in a plane is large compared with the refractive index ($n_z$) in the thickness direction. The phase difference compensation elements 46 and 48 have refractive indices anisotropy in the plane. This configuration eliminates, degradation of the viewing angle characteristic when a viewing angle is shifted away from the absorption axes 42a and 44a of the polarizers 42 and 44. Material of the polarizers and the phase difference compensation elements has a $10 \times 10^{-13}$ $cm^2$/dyne or less photoelasticity coefficient. Preferably, the phase difference compensation elements have non-zero birefringence and the average refractive indices in the range of 1.4–1.7.

The polarizers used in this embodiment and the following examples include supporting films commercially available from Sanritsu Co. Ltd., Nitto Denko Corp., and Sumitomo Chemical Co., Ltd. These supporting films are made of high dimensionally stable TAC. These TAC films have retardation. Therefore, the retardation of the polarizer is taken into account when designing the retardation of the phase difference compensation element in the present invention.

The relationship between the refractive indices of the phase difference compensation elements in the present invention needs to satisfy $n_z < n_y < n_x$ as described above. When a phase difference compensation element includes a phase difference film having negative birefringence made of a laminated phase retardation plates (or phase difference films) or a coating film of liquid crystal polymer, only the entire phase difference compensation element as a whole needs to satisfy the above relationship.

Figure 9:
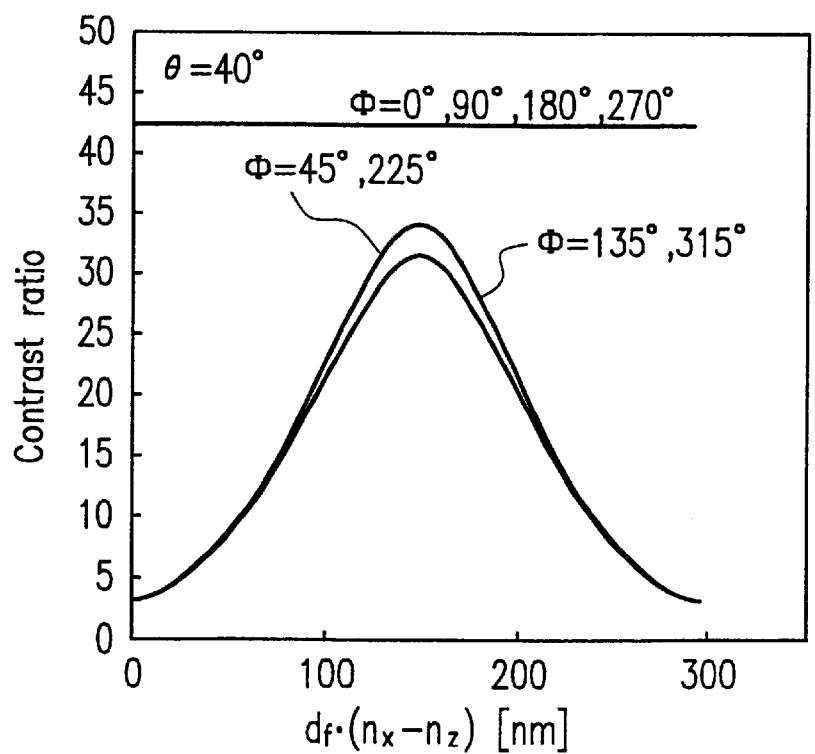
FIG. 9 is a graph showing a relationship between the retardation $d_f(n_x-n_z)$ of a phase difference compensation element ($n_x=n_y>n_z$) and a contrast ratio.

The contrast ratios of a liquid crystal display device shown in FIG. 9 were measured under conditions that the birefringence $\Delta n$ of the liquid crystal material is $\Delta n = 0.073$; the thickness $d_{LC}$ of the liquid crystal layer (cell thickness) is $d_{LC} = 6$ $\mu m$ (i.e., the retardation of the liquid crystal cell is $d_{LC}\Delta n = 438$ nm); the orientation of the liquid crystal molecules is axially symmetrical in each liquid crystal region; the principal refractive indices of the phase difference compensation element have the relationship $n_x = n_y > n_z$; where the thickness of the phase difference compensation element is $d_f$, the retardation $d_f(n_x - n_z)$ of the phase difference compensation element varies in the range of 0–280 nm; the viewing azimuthal angles $\Phi$ are $\Phi = 45°, 135°, 225°, 315°$ (assuming that the absorption axis of the lower polarizer on the light-source's side of the liquid crystal cell is oriented at $\Phi = 0°$) and $\Phi = 0°, 90°, 180°, 270°$ (directions parallel or perpendicular to the polarization axes of the upper and lower polarizers); and the viewing angle $\theta$ is $\theta = 400$. FIG. 9 shows a result of the measurement of the contrast ratios.

The transmission-viewing angle characteristics of the liquid crystal display device of the present embodiment were measured in a black display where a driving voltage $V_{off}$ is 2.2 V and then in a white display where a driving voltage $V_{on}$ is 7 V using an instrument for evaluating optical characteristics (LCD5000 (an optical property evaluating device produced by Otsuka Denshi Co. Ltd.). The viewing angle characteristic of the contrast was calculated by-dividing the transmission in a white display by the transmission in a black display.

As shown in FIG. 9, the contrast ratios at $\Phi = 0°, 90°, 180°$, and $270°$ are almost constant irrespective of the value of $d_f(n_x - n_z)$. The contrast ratios at $\Phi = 45°, 135°, 225°$, and $315°$ increase as the value of $d_f(n_x - n_z)$ increases from 0, reach at the maximum value when $d_f(n_x - n_z) = 146$ nm, and then decrease as $d_f(n_x - n_z)$ increases further.

In fact, it is difficult to manufacture the phase difference compensation element of which the in-plane refractive indices satisfy $n_x = n_y$. Therefore, the condition $n_x = n_y > n_z$ may be changed to $n_z < n_y < n_x$ which is more easily obtained in practical use. In this case, a phase difference compensation element having the desired retardation can increase the maximum contrast ratio at $\Phi = 45°$ ($\Phi = 45°$ is a direction bisecting an angle between the orthogonally crossing absorption axes of polarizers). The phase difference compensation element satisfying $n_z < n_y < n_x$ can obtain the desired retardation by a process comprising coating a material, such as liquid crystal polymer, having a low photoelasticity coefficient and low refractive index anisotropy in a short axis direction of a molecule. The phase difference compensation element may also be formed by producing a film of material having a low photoelasticity coefficient (e.g., TAC) and stretching the obtained film, or combining the film and a coating of liquid crystal polymer.

Figure 10A:
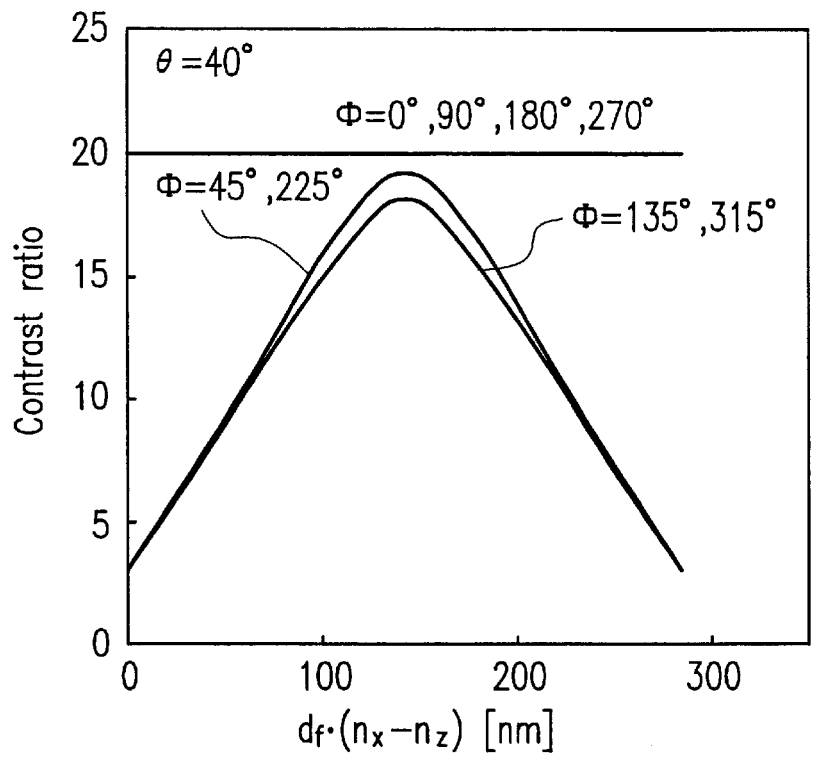
FIG. 10A is a graph showing a relationship between the retardation $d_f(n_x-n_z)$ of a phase difference compensation element ($n_z<n_y<n_x$) and a contrast ratio.

FIG. 10A shows results of the measurement of the contrast ratios of a liquid crystal display device of the present invention where the principal refractive indices of the phase difference compensation element: $n_z < n_y < n_x$; the retardation of the phase difference compensation element $d_f(n_x - n_z)$ varies from 0 nm to 280 nm while $d_f(n_x - n_y)$ is kept at 12 nm: the viewing azimuthal angles: $\Phi = 45°$ and $90°$: and the viewing angle: $\theta = 40°$. When $\Phi = 90°$, the contrast ratio is constant irrespective of the value of $d_f(n_x - n_z)$. When $\Phi = 45°$, the contrast ratio increases as the value of $d_f(n_x - n_z)$ increases from 0 nm, and reaches the maximum at $d_f(n_x - n_z) = 142$ nm. As can be seen from FIG. 10A, the contrast ratio is improved at a 45° direction with respect to the absorption axis of a polarizer in the range of 0 nm $< d_f(n_x - n_z) < 280$ nm when considering only the phase difference compensation element, or 50 nm $< d_f(n_x - n_z) < 330$ nm when considering the 50 nm retardation in the normal direction of a polarizer made of a TAC film in addition of the phase difference compensation element.

Figure 10B:
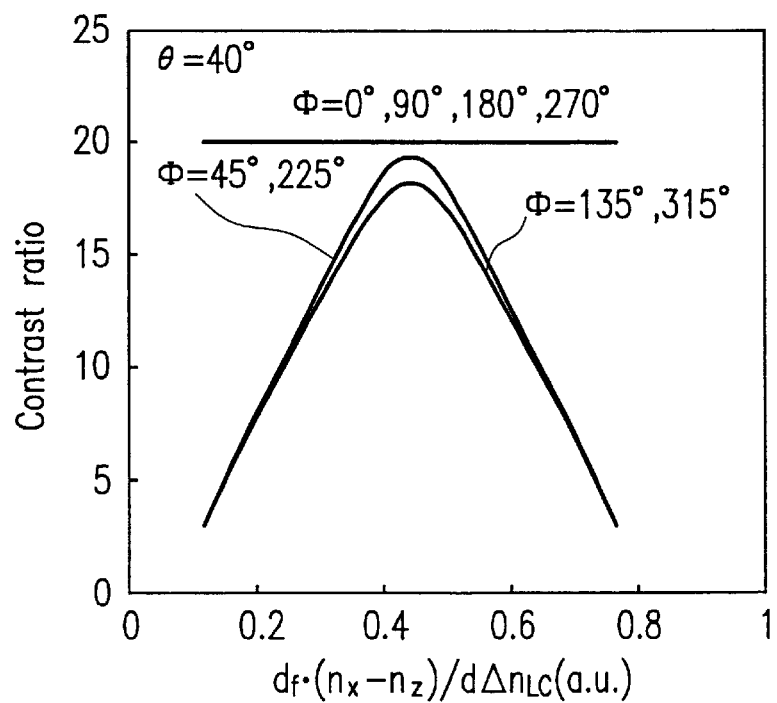
FIG. 10B is a graph showing a relationship between a relative value of the retardation $d_f(n_x-n_z)$ of a phase difference compensation element ($n_z<n_y<n_x$) with respect to the retardation $d_{LC}\cdot\Delta n$ of a liquid crystal layer, and a contrast ratio.

FIG. 10B shows a relative value of the retardation $d_f(n_x - n_z)$ of the above-described phase difference compensation element with respect to the value of $d_{LC} \cdot \Delta n$ of the liquid crystal cell to be compensated ($d_{LC} \cdot \Delta n$=438 nm where $d_{LC}$ is a cell thickness and $\Delta n$ of the liquid crystal is $|n_e-n_o|$). The viewing angle compensation effect for retardation of liquid crystal layer ($d_{LC} \cdot \Delta n$) is expected to be obtained in the range of $0.11<\{d_f(n_x-n_z)\}/(d_{LC} \cdot \Delta n)<0.75$.

A higher level of the viewing angle compensation effect will be expected when the in-plane retardation $d_f(n_x-n_y)$ is more than 12 nm. As described below in Example 2, a more preferable in-plane retardation is in the range of 47–85 nm. When a viewing angle is oblique with respect to the normal direction of the display surface, a liquid crystal molecule oriented in a direction perpendicular to the substrate surface is, for a viewer, seen tilted from the viewing direction by the angle between the viewing direction and the normal direction of the display surface. Therefore, retardation is generated in a virtual plane containing the viewing direction. As described above, the use of a phase difference compensation element having in-plane retardation can compensate the retardation generated by an oblique viewing angle.

In the embodiment, phase difference compensation elements are disposed on the opposite sides of a liquid crystal cell. In the case where a phase difference compensation element is disposed on only one side of the liquid crystal cell, substantially double the value of the retardation described above may obtain the viewing angle compensation effect.

As shown in FIGS. 4 and 5B, in this embodiment, the phase difference compensation elements 46 and 48 are disposed on the upper and lower sides of the liquid crystal cell 40. Further, the slow axes 46a and 48a of the respective phase difference compensation elements 46 and 48 are orthogonally crossed. This is because a decrease in the contrast ratio when viewing the liquid crystal display device 100 from the front (in the normal direction of the display surface) is circumvented.

When the slow axes 46a and 48a of the respective phase difference compensation elements 46 and 48 are not orthogonally crossed, in-plane phase retardation is generated in the entire phase difference compensation elements. Therefore, an unsatisfactory black display is obtained, resulting in a decrease in the contrast ratio. This embodiment uses the display mode where liquid crystal molecules are axially symmetrically oriented and the orientations of the liquid crystal molecules vary continuously. Therefore, once a viewing angle characteristic in a 45° direction away from the absorption axes 42a and 44a of the respective polarizers 42 and 44 is improved, an isotropic viewing characteristic is obtained in all azimuthal angles. When each pixel is divided into two or more domains which have different liquid crystal orientation, a viewing characteristic in the 45° direction away from the absorption axes of the polarizers can be improved. In both of the display modes where each pixel is divided into domains having different orientations and where liquid crystal molecules are axially symmetrically aligned and the alignment directions vary continuously, when the liquid crystal molecules are oriented in a direction perpendicular to the substrate surface in a black display, the transmission of a black level is prevented from increasing, thereby obtaining improvement in a contrast ratio, i.e., a viewing angle compensation effect.

As the photoelasticity coefficient of a phase difference compensation element is decreased from $10 \times 10^{-13}$ cm$^2$/dyne, generation of nonuniformity due to attachment of the phase difference compensation element to a polarizer or liquid crystal cell is further decreased and therefore light leakage is prevented, thereby improving a uniform level of display quality. More preferably, the photoelasticity coefficient of a phase difference compensation element is $5 \times 10^{-13}$ cm$^2$/dyne or less in order to obtain a high-quality display.

A phase difference compensation element can be made by a film-stretching technique. A phase difference compensation element can be a layered structure of such stretched films in order to obtain desired retardation. For example, a phase difference compensation element may be manufactured by disposing a coating of discotic liquid crystal polymer on a supporting substrate, and laminating another supporting substrate or a polarizer (a polarizer may be used as the other supporting substrate) on the coated surface, so that the phase difference compensation element can obtain negative retardation in a direction normal to the film. Further, a positive uniaxial phase retardation element having retardation in a plane of a film can be used as a supporting substrate, or the orientation states of the liquid crystal polymer can be varied in the thickness direction so as to obtain a biaxial phase retardation element.

The liquid crystal display device of the present invention can be operated by any driving system such as, for example, a passive matrix drive, an active matrix drive using thin film transistors etc., and a plasma addressed drive (PALC) using plasma.

EXAMPLES

Example 1

Figure 11A:
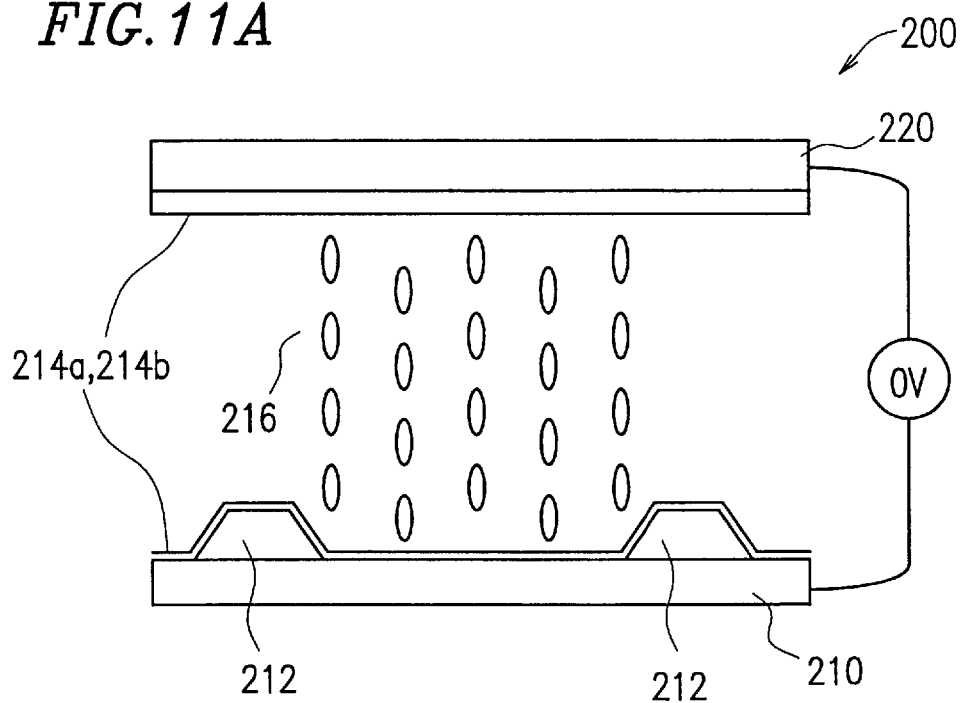
FIG. 11A is a cross-sectional view schematically illustrating a state of a liquid crystal display device-according to an example of the present invention in the absence of applied voltage.

A method for producing a 42-inch liquid crystal display device 200 according to Example 1 of the present invention will be described with reference to FIG. 11A. A transparent electrode (ITO: 100 nm, not shown) was formed on an upper surface of a substrate 210. A first protrusion structure 212 having a height of about 3 μm was formed on the electrode and the substrate 210. The first protrusion structure 212 was made of photosensitive polyimide and provided outside pixels. A second protrusion structure (not shown) having a height of about 3 μm and a width less than the width of the first protrusion structure 212 was formed on part of the first protrusion structure 212 using photo-sensitive polyimide. The sum of the height of the first protrusion structure 212 and the height of the second protrusion structure formed on the first protrusion structure 212 defines the cell thickness.

The pixel region surrounded by the first protrusion structure 212 had a size, i.e., the size of the pixel of approximately 100 μm×100 μm. A vertical orientation layer 214a was formed to cover the first protrusion structure 212, the electrode, and the substrate 210 with the JALS204 (Japan Synthetic Rubber Co., Ltd.) by spin-coating. A transparent electrode (not shown) was formed on a lower surface of a counter substrate 220. A vertical orientation layer 214b of the same material as that of the vertical orientation layer 214a was formed to cover the electrode and the counter substrate 220. The substrate 210 and the counter substrate 220 were attached to form a liquid crystal cell.

Polarizers (not shown) are provided on the opposite sides of the liquid crystal cell. Phase difference compensation elements of the present invention (not shown) are provided between each polarizer and the liquid crystal cell.

Figure 11B:
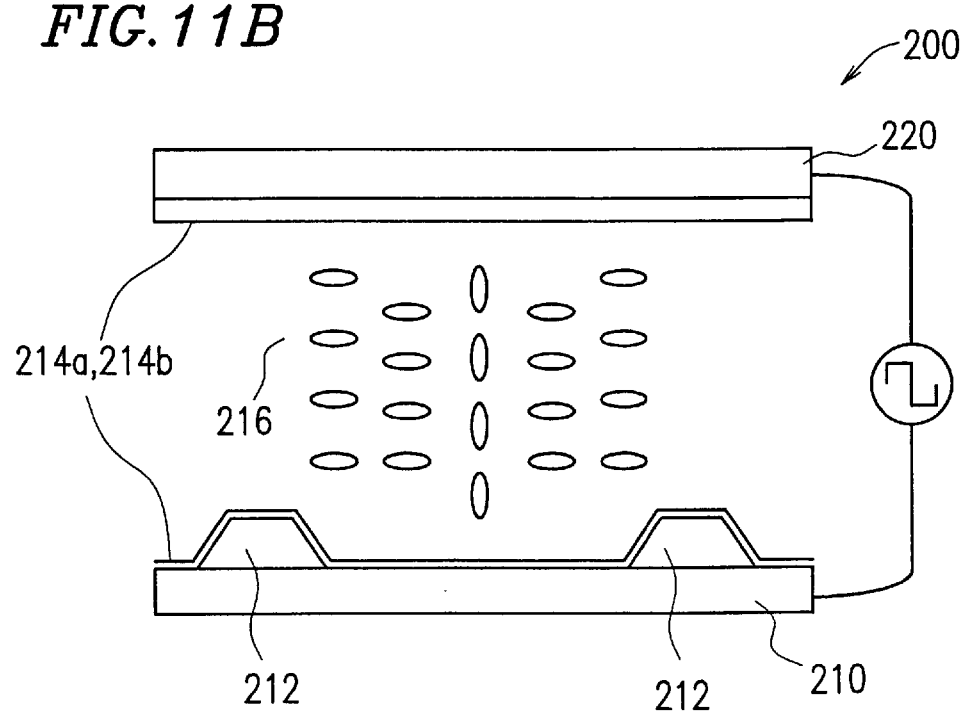
FIG. 11B is a cross-sectional view schematically illustrating a state of a liquid crystal display device according to an example of the present invention in the presence of applied saturated voltage.
Figure 11C:
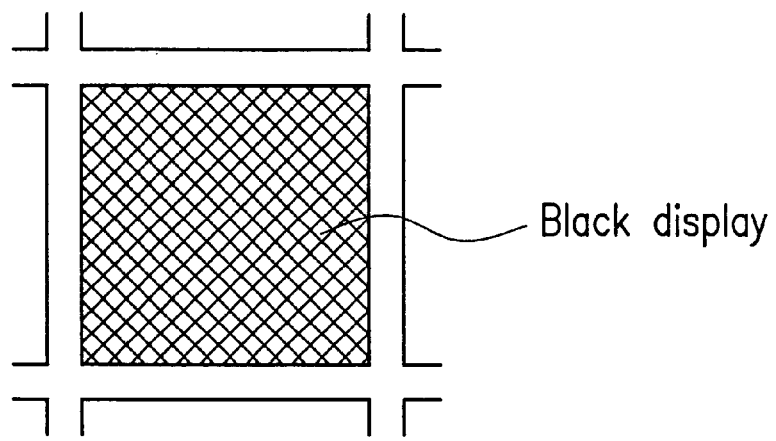
FIG. 11C is a cross-sectional view schematically illustrating a pixel region in the absence of applied voltage of a liquid crystal display device according to an example of the present invention where the pixel region is observed in the crossed-Nicols arrangement.
Figure 11D:
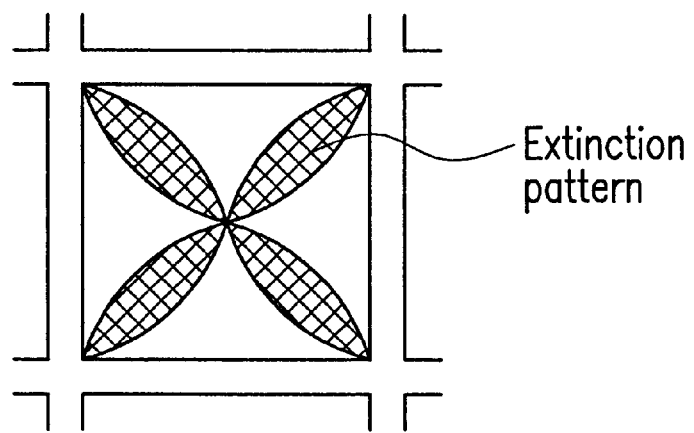
FIG. 11D is a cross-sectional view schematically illustrating a pixel in the presence of applied saturated voltage of a liquid crystal display device according to an example of the present invention where the pixel region is observed in the crossed-Nicols arrangement.

An Nn-type liquid crystal material ($\Delta \epsilon$=−4.0, $\Delta n$=0.073, a twist angle inherent to the liquid crystal material was prepared in such a way as to obtain 90° twist over a cell gap of 6 μm ($d_{LC} \cdot \Delta n$=438 nm)) was injected into the liquid crystal cell. Then, a voltage of 7 V was applied across the liquid crystal cell. There are a plurality of orientation axes of axially symmetrically orientation in an initial period immediately after applying voltage. In the continued presence of applied voltage, a single axially symmetrical orientation domain (mono-domain) was formed in each pixel as shown in FIG. 11B. The pixel was observed in the crossed-Nicols state. The results are shown in FIG. 11C and 11D. In the absence of applied voltage, a satisfactory black display was obtained as shown in FIG. 11C. In the presence of applied voltage, a light extinction pattern was observed as shown in FIG. 11D. Accordingly, liquid crystal molecules 216 are axially symmetrically oriented and the alignment directions of the liquid crystal molecules vary continuously in each pixel.

Each polarizer includes a supporting film made of TAC. The supporting film has principal refractive indices such that $n_x=1.4952$, $n_y=1.4951$, and $n_z=1.4964$, a thickness of 80 $\mu$m, and retardation approximately such that $d_f(n_x-n_y)=5$ nm and $d_f(n_x-n_z)=50$ nm. The phase difference compensation elements of the present invention have principal refractive indices such that $n_x=1.50058$, $n_y=1.50043$, and $n_z=1.49881$, a thickness of 80 $\mu$m, and retardation such that $d_f(n_x-n_y)=12$ nm and $d_f(n_x-n_z)=142$ nm. The polarizers and the phase difference compensation elements were arranged as shown in FIG. 4. The absorption axis of a polarizer and the slow axis of a phase difference compensation element attached to the polarizer are orthogonally crossed. Therefore, the slow axis of the TAC supporting film included in the polarizer is also orthogonal to the slow axis of the phase difference compensation element.

Figure 12:
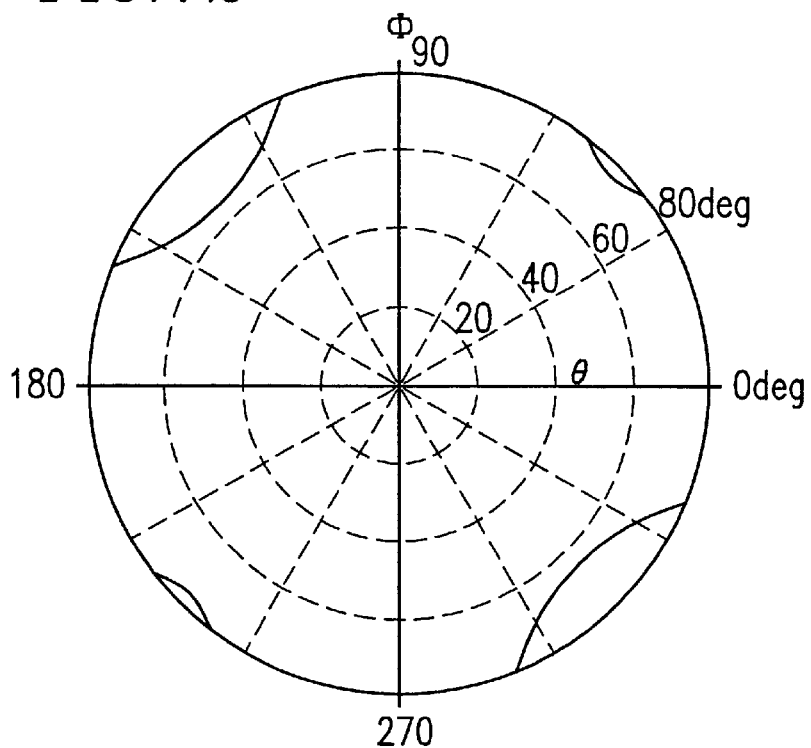
FIG. 12 is an isocontrast diagram illustrating isocontrast contour curves at a contrast ratio of 10 for a liquid crystal display device according to an example of the present invention.

The viewing angle characteristic of transmission of the liquid crystal display device 200 of this example were measured in a black display where a driving voltage $V_{off}$ is 2.2 V and then in a white display where a driving voltage $V_{on}$ is 7 V using an instrument for evaluating optical characteristics (LCD5000 (an optical property evaluating device produced by Otsuka Denshi Co. Ltd.). Further, the transmission in a white display is divided by the transmission in a black display to obtain a viewing angle characteristic of the contrast ratio. As a result, an isocontrast diagram illustrating isocontrast contour curves of a contrast ratio 10 is obtained as shown in FIG. 12.

The supporting films of the polarizers used in Example 1 were made of TAC and each had a photoelasticity coefficient of $5 \times 10^{-13}$ cm$^2$/dyne. The phase difference compensation elements each had $5 \times 10^{-13}$ cm$^2$/dyne. The phase difference compensation elements were prepared by coating a discotic liquid crystal polymer on a supporting substrate of TAC while controlling a thickness of the coating in order to obtain the desired retardation. The coating was heated and then cooled to be completed. The resultant phase difference compensation elements were attached to the respective polarizers using adhesive. A pair of combinations of a phase difference compensation element and a polarizer were attached on the opposite sides of the liquid crystal cell using adhesive, respectively.

In the above-described 42-inch liquid crystal display device 200, no nonuniformity due to light leakage through the polarizers and the phase difference compensation elements was observed, both when the entire display screen was in a black display state and when the liquid crystal cell was heated up to about 45° C.±5° C. by a backlight system. Therefore, the liquid crystal display device 200 had a good display quality.

According to brightness discrimination principles, a level of brightness distribution on a display surface of the liquid crystal panel, at which a viewer does not recognize nonuniform brightness, should satisfy a condition such that the ratio of the maximum brightness $L_{max}$ to the average brightness $L_{average}$ is less than 2. This condition was confirmed by measuring brightness or transmission. The measurement was performed using a system as shown in FIG. 6B. The phase difference compensation element used in Example 1 had $L_{max}/L_{average}=1.5$. This was a level at which nonuniformity is unlikely to be recognized by a viewer. In this case, the transmission was 0.04% or less.

The retardation $d \cdot \Delta n$ of a liquid crystal layer is preferably in the range of 300–500 nm. The twist angle of a liquid crystal layer is preferably in the range of 45–110°.

Example 2

A 42-inch liquid crystal display device according to Example 2 of the present invention includes biaxial phase difference compensation elements of ARTON (norbornene resin) which can achieve a significant effect of viewing angle compensation, instead of the phase difference compensation elements of the liquid crystal polymer of Example 1. The biaxial phase difference compensation elements were provided on the opposite sides of a liquid crystal cell as shown in FIG. 4 and contributed to a significant viewing angle compensation effect.

ARTON is characterized in that its wavelength dispersion characteristic is flat at visible wavelengths. In general, to make viewing angle compensation effects equivalent in each wavelength of RGB, the wavelength dispersion characteristic of a phase difference film is preferably lower and flatter.

A phase difference compensation element made of a biaxial stretched film of ARTON had a photoelasticity coefficient of $4 \times 10^{-13}$ cm$^2$/dyne. In the above-described 42-inch liquid crystal display device, no nonuniformity due to light leakage through the polarizers and the phase difference compensation elements was observed, both when the entire display screen was in a black display state and when the panel was heated up to about 45° C.±5° C. by a backlight system. Therefore, the liquid crystal display device had a good display quality. The phase difference compensation elements used in Example 2 each had $L_{max}/L_{average}=1.4$. This was a level at which nonuniformity is unlikely to be recognized by a viewer. In view of Examples 1 and 2, the phase difference compensation element having a photoelasticity coefficient of less than $5 \times 10^{-13}$ cm$^2$/dyne led to less nonuniformity.

A viewing angle characteristic and a visual check of image on screen were measured when a contrast ratio CR is 20. The results are summarized in Table 1. When the retardation $d_f(n_x-n_y)$ in a plane of the phase difference compensation element was in the range of 0–116 nm, more preferably 47–85 nm, and the retardation $d_f(n_x-n_z)$ in the normal direction of the phase difference compensation element was 122–208 nm, more preferably 147–198 nm, a viewing angle compensation effect in a 45° direction with respect to the absorption axis of a polarizer was obtained and therefore a satisfactory viewing characteristic was achieved over all azimuthal angles.

TABLE 1

Viewing Angle Characteristic (V.A.C.) and Visual Check of Image on Screen (V.C.I.S.)

|  | $d_f \cdot (n_x - n_y)$ (nm) | $d_f \cdot (n_x - n_z)$ (nm) | V.A.C.(CR20) top-bottom-left-right | 45° | V.C.I.S. |
|---|---|---|---|---|---|
| No.1  | 72  | 145 | 140° | 110° | ⊚ |
| No.2  | 73  | 191 | 140° | 110° | ⊚ |
| No.3  | 53  | 122 | 140° | 110° | ⊚ |
| No.4  | 67  | 147 | 140° | 120° | ⊚ |
| No.5  | 77  | 161 | 140° | 120° | ⊚ |
| No.6  | 85  | 156 | 140° | 120° | ⊚ |
| No.7  | 115 | 208 | 140° | 90°  | ○ |
| No.8  | 114 | 198 | 140° | 80°  | ○ |
| No.9  | 116 | 195 | 140° | 80°  | ○ |
| No.10 | 52  | 170 | 140° | 120° | ⊚ |
| No.11 | 64  | 159 | 140° | 120° | ⊚ |
| No.12 | 67  | 164 | 140° | 120° | ⊚ |
| No.13 | 47  | 198 | 140° | 120° | ⊚ |
| No.14 | 65  | 168 | 140° | 120° | ⊚ |

○: good ⊚: very good

The retardation $d_f(n_x-n_z)$ of the phase difference compensation element is represented by a relative value with respect to the value of $d_{LC} \cdot \Delta n$ of the compensated liquid crystal cell ($d_{LC}$ is the cell thickness and $\Delta n$ is the $|n_e-n_o|$ of a liquid crystal used; and their product $d_{LC} \cdot \Delta n = 438$ nm). The 50 nm retardation in the normal direction of a polarizer supporting film of TAC must be taken into account. The retardation in a film plane was 5 nm, which was small enough to be negligible. When the retardation in the $n_x-n_y$ direction in the film plane satisfies $0<\{d_f(n_x-n_y)\}/(d_{LC} \cdot \Delta n)<0.26$, and the retardation in the normal direction, i.e., $n_z$ direction, satisfies $0.39<\{d_f(n_x-n_z)\}/(d_{LC} \cdot \Delta n)<0.59$, the viewing angle compensation effect in a 45° direction with respect to the absorption axis of a polarizer was improved. More preferable conditions to obtain isotropic isocontrast contour curves were $0.1<\{d_f(n_x-n_y)\}/(d_{LC} \cdot \Delta n)<0.2$ and $0.44<\{d_f(n_x-n_z)\}/(d_{LC} \cdot \Delta n)<0.57$.

Example 3

Figure 13:
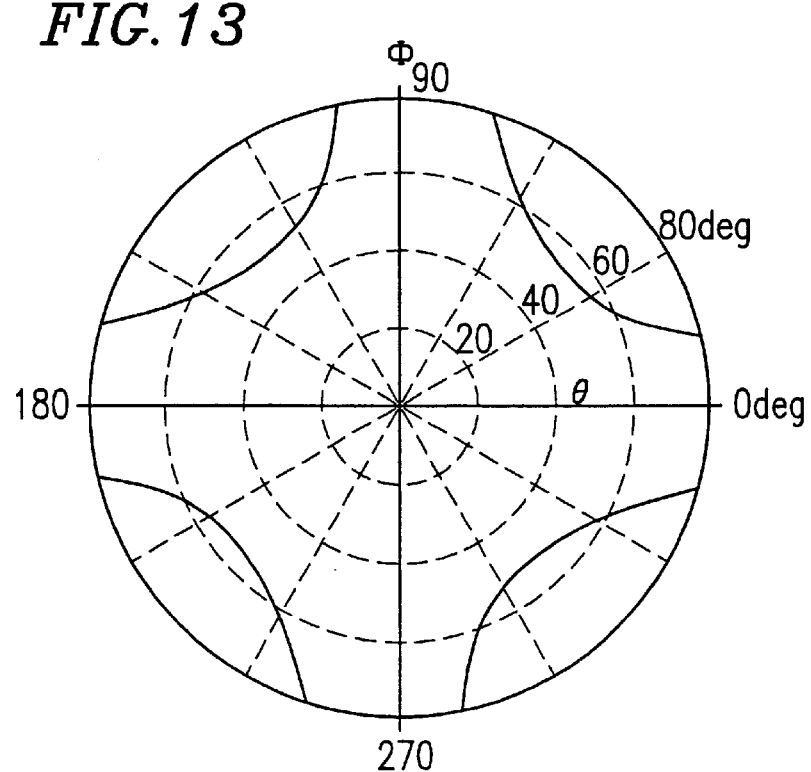
FIG. 13 is an isocontrast diagram illustrating isocontrast contour curves at a contrast ratio of 10 for a liquid crystal display device according to another example of the present invention.

A liquid crystal display device according to Example 3 of the present invention has the same construction as that of the liquid crystal display device of Example 1, except that a set of two phase difference compensation elements of Example 1 or 2, or one phase difference compensation element having double the value of retardation of the phase difference compensation element of Example 1 or 2 is disposed between the liquid crystal cell and only one of the upper and lower polarizers 42 or 44. FIG. 13 is an isocontrast diagram illustrating isocontrast contour curves of a contrast ratio 10 when the liquid crystal display device was measured in the same fashion as used in Example 1. The viewing angle characteristics of the liquid crystal display device were almost the same and satisfactory in the absorption directions of the polarizers ($\Phi=0°$, 90°, 180°, 270°). However, the viewing angle characteristics in a 45° direction with respect to the absorption axes of the polarizers ($\Phi=45°$, 135°, 225°, 315°) were slightly less satisfactory than when in Example 1 (FIG. 12). Nevertheless, nonuniformity due to light leakage through the polarizers was not observed in a black display. Providing phase difference compensation elements at only one position is advantageous from the viewpoint of cost and fabrication process.

Example 4

Figure 15A:
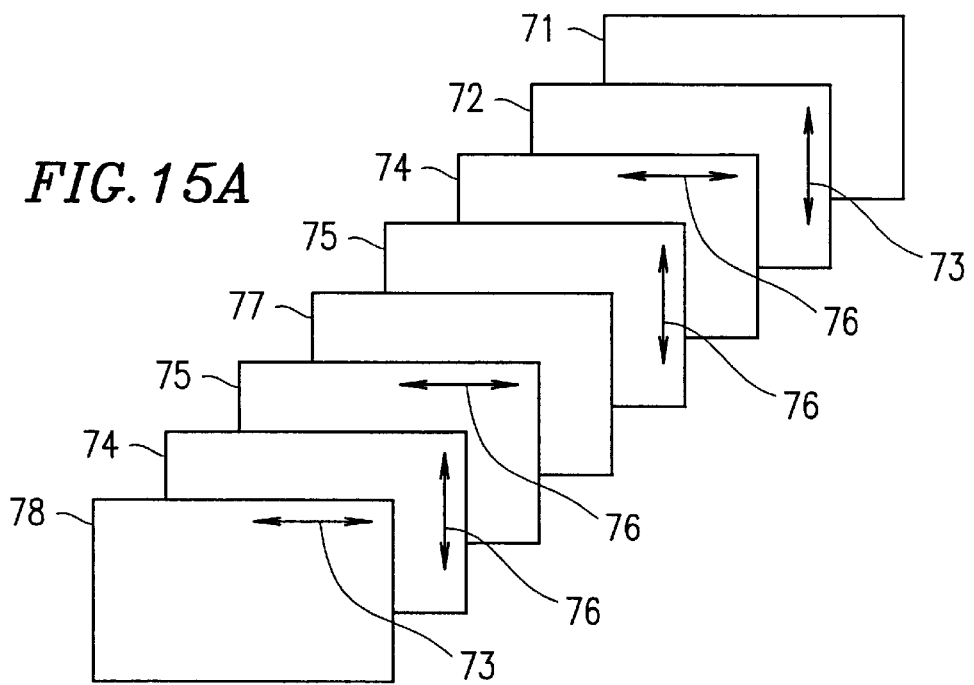
FIG. 15A is an exploded, perspective view schematically illustrating a liquid crystal display device according to Example 4 of the present invention.
Figure 15B:
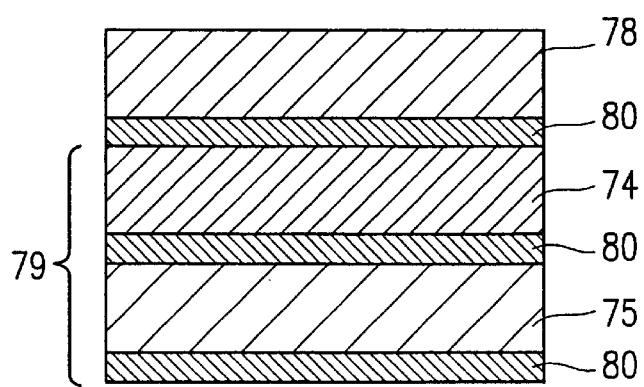
FIG. 15B is across-sectional view illustrating a phase difference film and a polarizer used in Example 4.

A liquid crystal display device according to Example 4 of the present invention includes biaxial phase difference compensation elements. FIG. 15A is an exploded, perspective view schematically illustrating the liquid crystal display device. FIG. 15B illustrates a construction of the biaxial phase difference compensation element 79. The biaxial phase difference compensation element 79 includes an ARTON (norbornene resin) film 74 and a uniaxial phase difference film (TAC) 75. In the liquid crystal display device of Example 4, one biaxial phase difference compensation element is provided on each of the opposite sides of a liquid crystal cell 77, respectively, while slow axes 76 of the ARTON film 74 and the uniaxial phase difference film (TAC) 75 are directed as shown in FIG. 15A. Reference numeral 71 designates a backlight; 72 and 78 designate lower and upper polarizers, respectively; 73 designates the absorption axes of the polarizers 72 and 78; and 80 designates adhesive layers. The isocontour characteristic at a contrast ratio of 20 of the liquid crystal display device of Example 4 was similar to that of the liquid crystal display device of Example 2. In particular, when a viewing angle was fallen in a 45° direction, it was observed that variation of the color of a black level was smaller. Further, in a black display, substantially no nonuniformity due to light leakage through a polarizer was observed. The results of a viewing angle characteristic and a visual check of image on screen in Example 4 are shown in Table 2 below.

TABLE 2

Viewing Angle Characteristic (V.A.C.) and Visual Check of Image on Screen (V.C.I.S.) for Example 4

|  | $d_f \cdot (n_x - n_y)$ (nm) | $d_f \cdot (n_x - n_z)$ (nm) | V.A.C.(CR20) top-bottom-left-right | 45° | V.C.I.S. |
|---|---|---|---|---|---|
| No.1 | 34 | 153 | 140° | 120° | ⊚ |
| No.2 | 43 | 174 | 140° | 120° | ⊚ |
| No.3 | 50 | 170 | 140° | 120° | ⊚ |

○: good ⊚: very good

Comparative Example 1

A liquid crystal display device used in Comparative Example 1 has a construction similar to that of the liquid crystal display device in Example 1, except that the liquid crystal display device of Comparative Example 1 does not include any phase difference compensation element.

Figure 14:
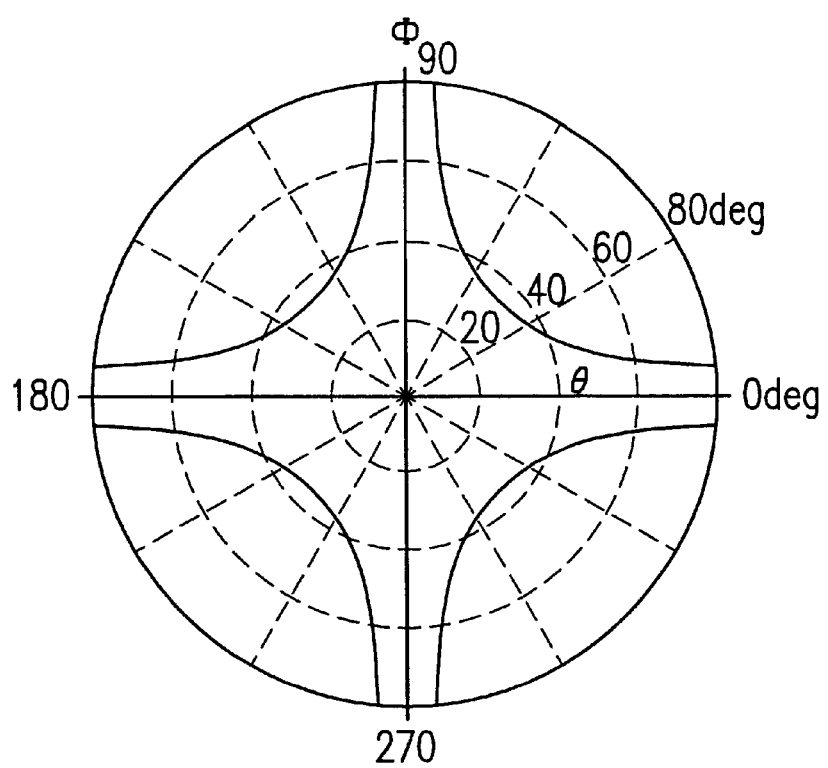
FIG. 14 is an isocontrast diagram illustrating isocontrast contour curves at a contrast ratio of 10 for a liquid crystal display device according to Comparative Example 1 of the present invention.

FIG. 14 is an isocontrast diagram illustrating isocontrast contour curves at a contrast ratio of 10 for the liquid crystal display device of Comparative Example 1 measured in the same fashion as used in Example 1. The viewing angle characteristics of the liquid crystal display device were almost identical and satisfactory in the absorption directions of the polarizers ($\Phi=0°$, 90°, 180°, 270°). However, the viewing angle characteristics in a 45° direction with respect to the absorption axes of the polarizers ($\Phi=45°$, 135°, 225°, 315°) were significantly poor. Nevertheless, nonuniformity due to light leakage through a polarizer was not observed in a black display. Thus, no light leakage is generated by only polarizers. When attaching a polarizer to a phase difference compensation element, nonuniformity occurs due to the structure in which a liquid crystal cell is attached to a phase difference compensation element. In Comparative Example 1, nonuniformity of brightness was $L_{max}/L_{average}<1.2$ and therefore was not recognized.

Comparative Example 2

To a 42-inch liquid crystal cell used in Example 1, phase difference compensation elements 46 and 48 each having $d_f(n_x-n_y)=12$ nm, $d_f(n_x-n_z)=142$ nm, and a photoelasticity coefficient of $70-90\times10^{-13}$ cm²/dyne were disposed. A viewing angle characteristic of the liquid crystal display device was measured. The resultant isocontrast contour curves for the liquid crystal display device of Comparative Example 2 were the same as those for the liquid crystal display device of Example 1 (FIG. 12). However, nonuniformity due to light leakage through a polarizer and a phase difference compensation element was observed in a black display. The value of the nonuniformity of brightness was $L_{max}/L_{average} \geq 2$. This means that a viewer would recognize the nonuniformity of brightness.

As described above, the direct-view-type, ultra-large-size (e.g., 42-inch) liquid crystal display device according to the present invention includes a phase difference compensation element having a photoelasticity coefficient of $10\times10^{-13}$ cm²/dyne or less. Therefore, even in the case where a phase difference compensation element is attached to a polarizer, or a phase difference compensation element is attached to a liquid crystal panel, the transmission of the liquid crystal display device in the crossed-Nicols state of polarizers can be 0.04% or less, and the polarization thereof can be 99.9% or more. Furthermore, the brightness distribution in a black display of the liquid crystal display device according to the discrimination principle can be $L_{max}/L_{average}<2$. Therefore, the liquid crystal display device of the present invention has substantially no nonuniformity of polarization, thereby obtaining uniform display quality.

Moreover, the poor viewing angle characteristic in a 45° direction with respect to the absorption axis of a polarizer is relieved. In the case where each pixel has two or more domains having different alignment directions of liquid crystal molecules or where liquid crystal molecules are axially symmetrically aligned and the alignment directions of the liquid crystal molecules vary continuously in each liquid crystal region, when a biaxial phase difference compensation element is used and the slow axis of the biaxial phase difference compensation element is orthogonal to the absorption axis of a polarizer, a viewing angle can be significantly widened and a viewing angle characteristic can be isotropic at all azimuthal angles. Therefore, the liquid crystal display device of the present invention has an excellent viewing angle characteristic and a high level of contrast.

The liquid crystal display device of the present invention may be suitably used for a direct-view-type flat display used in a personal computer, a word processor, an arcade game, a television set, and the like, or may be used for a display board, a window, a wall and the like which utilize the shutter effect.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:
    a liquid crystal cell comprising a pair of substrates and a liquid crystal layer, the liquid crystal layer being sandwiched between the pair of substrates;
    a pair of polarizer elements sandwiching the liquid crystal cell; and
    two phase difference compensation elements a first phase difference compensation element being sandwiched between the liquid crystal cell and one of the pair of polarizer elements and a second phase difference compensation element being sandwiched between the liquid crystal cell and the other of the pair of polarizer elements,
    each of the first and second phase difference compensation elements having the slow axis in a plane parallel to a surface of the liquid crystal cell and having a layered structure of two or more uniaxial films attached to each other,
    the slow axis of the first phase difference compensation element being orthogonal to the absorption axis of one of the pair of polarizer elements provided on the same side with respect to the liquid crystal cell as the first phase difference compensation element, and the slow axis of the second phase difference compensation element being orthogonal to the absorption axis of one of the pair of polarizer elements provided on the same side with respect to the liquid crystal cell as the second phase difference compensation element,
    wherein a photoelasticity coefficient of the phase difference compensation elements is $10\times10^{-13}$ cm²/dyne or less, and the phase difference compensation element has three refractive indices $n_x$, $n_y$, and $n_z$ in directions of x, y, and z axes which are orthogonal to each other, and the refractive indices $n_x$, $n_y$, and $n_z$ satisfies a relationship $n_z<n_y<n_x$ where the $n_x$ and $n_y$ are principal refractive indices in a plane parallel to a surface of the liquid crystal cell and the $n_z$ is a principal refractive index in the thickness direction of the liquid crystal cell, and
    wherein the liquid crystal layer includes nematic liquid crystal material, and liquid crystal molecules of the nematic liquid crystal material are, in a black display, oriented in a direction substantially perpendicular to a surface of the pair of substrates.

2. A liquid crystal display device according to claim 1, wherein:
    the liquid crystal cell has a plurality of pixels, and each of the plurality of pixels has two or more liquid crystal domains having different initial orientation states or has a liquid crystal region where orientation directions of liquid crystal molecules therein continuously vary; and
    the slow axes in the plane parallel to a surface of the liquid crystal cell, of the first and second phase difference compensation elements are orthogonally crossed.

3. A liquid crystal display device according to claim 1, wherein:
    the liquid crystal layer includes nematic liquid crystal material having negative dielectric anisotropy; and
    liquid crystal molecules of the nematic liquid crystal material are, in the absence of applied voltage, oriented in a direction substantially perpendicular to a surface of the pair of substrates.

4. A liquid crystal display device according to claim 1, wherein:
    the liquid crystal display device satisfies relationships $$0.11 < \{d_f(n_x-n_z)\}/(d_{LC}\cdot\Delta n) < 0.75 \text{ and}$$

$$0 < \{d_f(n_x-n_y)\}/(d_{LC}\cdot\Delta n) < 0.26$$

where $\Delta n$ is a birefringence of the liquid crystal molecule of the liquid crystal layer, $d_{LC}$ is an average thickness of the liquid crystal layer, and $d_f$ is a thickness of the phase difference compensation element.

5. A liquid crystal display device according to claim 1, wherein:

each of the pair of polarizer elements is a polarizer layer formed on a supporting film, and the supporting film serves as the phase difference compensation element.

6. A liquid crystal display device according to claim 1, wherein the phase difference compensation element includes liquid crystal polymer.

7. A liquid crystal display device according to claim 1, wherein:
the liquid crystal cell has a plurality of pixels, and each of the plurality of pixels has two or more liquid crystal domains having different initial orientation states or has a liquid crystal region where orientation directions of liquid crystal molecules therein continuously vary;
each of the first and second phase difference compensation elements include a plurality of layered phase difference films, each of the plurality of phase difference films having the slow axis in a plane parallel to a surface of the liquid crystal cell; and
the slow axes in the plane parallel to a surface of the liquid crystal cell, of the first and second phase difference compensation elements are orthogonally crossed to each other.

8. A liquid crystal display device according to claim 1, wherein:
the phase difference film has a layered structure in which two or more uniaxial films are attached to each other; and
at least one of the uniaxial films has retardation in the plane and in a direction of a normal line.

9. A liquid crystal display device according to claim 2, wherein:
the phase difference film has a structure in which material having refractive index anisotropy is layered on a supporting substrate.

10. A liquid crystal display device according to claim 1, wherein the photoelasticity coefficient of the phase difference compensation element is $5 \times 10^{-13}$ cm$^2$/dyne or less.

11. A liquid crystal display device, comprising:
a liquid crystal cell comprising a pair of substrates and a liquid crystal layer, the liquid crystal layer being sandwiched between the pair of substrates;
a pair of polarizer elements sandwiching the liquid crystal cell; and
two phase difference compensation elements a first phase difference compensation element being sandwiched between the liquid crystal cell and one of the pair of polarizer elements and a second phase difference compensation element being sandwiched between the liquid crystal cell and the other of the pair of polarizer elements;
each of the first and second phase difference compensation elements having the slow axis in a plane parallel to a surface of the liquid crystal cell,
the slow axis of the first phase difference compensation element being orthogonal to the absorption axis of one of the pair of polarizer elements provided on the same side with respect to the liquid crystal cell as the first phase difference compensation element, and the slow axis of the second phase difference compensation element being orthogonal to the absorption axis of one of the pair of polarizer elements provided on the same side with respect to the liquid crystal cell as the second phase difference compensation element,
wherein a photoelasticity coefficient of the phase difference compensation elements is $10 \times 10^{-13}$ cm$^2$/dyne or less, and the phase difference compensation element has three refractive indices $n_x$, $n_y$, and $n_z$ in directions of x, y, and z axes which are orthogonal to each other, and the refractive indices $n_x$, $n_y$, and $n_z$ satisfies a relationship $n_z < n_y < n_x$ where the $n_x$ and $n_y$ are principal refractive indices in a plane parallel to a surface of the liquid crystal cell and the $n_z$ is a principal refractive index in the thickness direction of the liquid crystal cell, and wherein the liquid crystal display device satisfies relationships $$0.11 < \{d_f(n_x - n_z)\}/(d_{LC} \cdot n) < 0.75 \text{ and}$$

$$0 < \{d_f(n_x - n_y)\}/(d_{LC} \cdot \Delta n) < 0.26$$

where $\Delta n$ is a birefringence of the liquid crystal molecule of the liquid crystal layer, $d_{LC}$ is an average thickness of the liquid crystal layer, and $d_f$ is a thickness of the two phase difference compensation elements.

12. A liquid crystal display device according to claim 11 wherein:
the liquid crystal cell has a plurality of pixels, and each of the plurality of pixels has two or more liquid crystal domains having different initial orientation states or has a liquid crystal region where orientation directions of liquid crystal molecules therein continuously vary; and
the slow axes in the plane parallel to a surface of the liquid crystal cell, of the first and second phase difference compensation elements are orthogonally crossed.

13. A liquid crystal display device according to claim 11, wherein:
in the liquid crystal layer includes nematic liquid crystal material; and
liquid crystal molecules of the nematic liquid crystal material are, in a black display, oriented in a direction substantially perpendicular to a surface of the pair of substrates.

14. A liquid crystal display device according to claim 11, wherein:
the liquid crystal layer includes nematic liquid crystal material having negative dielectric anisotropy; and
liquid crystal molecules of the nematic liquid crystal material are, in the absence of applied voltage, oriented in a direction substantially perpendicular to a surface of the pair of substrates.

15. A liquid crystal display device according to claim 11, wherein:
each of the pair of polarizer elements is a polarizer layer formed on a supporting film, and the supporting film serves as the phase difference compensation element.

16. A liquid crystal display device according to claim 11, wherein the phase difference compensation element includes liquid crystal polymer.

17. A liquid crystal display device according to claim 11, wherein:
the liquid crystal cell has a plurality of pixels, and each of the plurality of pixels has two or more liquid crystal domains having different initial orientation states or has a liquid crystal region where orientation directions of liquid crystal molecules therein continuously vary;
each of the first and second phase difference compensation elements include a plurality of layered phase difference films, each of the plurality of phase difference films having the slow axis in a plane parallel to a surface of the liquid crystal cell; and the slow axes in the plane parallel to a surface of the liquid crystal cell, of the first and second phase difference compensation elements are orthogonally crossed to each other.

18. A liquid crystal display device according to claim 12, wherein:

the phase difference film has a layered structure in which two or more uniaxial films are attached to each other; and at least one of the uniaxial films has retardation in the plane and in a direction of a normal line.

19. A liquid crystal display device according to claim 12, wherein:

the phase difference film has a structure in which material having refractive index anisotropy is layered on a supporting substrate.

20. A liquid crystal display devise according to claim 11, wherein the photoelasticity coefficient of the phase difference compensation element is $5 \times 10^{-13}$ cm$^2$/dyne or less.

* * * * *